(12) United States Patent
Umezaki

(10) Patent No.: US 9,560,381 B2
(45) Date of Patent: Jan. 31, 2017

(54) ENCODING SYSTEM, DEVICE, AND METHOD

(71) Applicant: FUJITSU LIMITED, Kawasaki-shi, Kanagawa (JP)

(72) Inventor: Yasushi Umezaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 347 days.

(21) Appl. No.: 14/485,910

(22) Filed: Sep. 15, 2014

(65) Prior Publication Data

US 2015/0003539 A1 Jan. 1, 2015

Related U.S. Application Data

(63) Continuation of application No. PCT/JP2012/057946, filed on Mar. 27, 2012.

(51) Int. Cl.
H04N 7/12 (2006.01)
*H04N 19/61* (2014.01)
*H04N 19/42* (2014.01)
*H04N 19/436* (2014.01)

(52) U.S. Cl.
CPC .............. *H04N 19/61* (2014.11); *H04N 19/42* (2014.11); *H04N 19/436* (2014.11)

(58) Field of Classification Search
CPC ....... H04N 19/61; H04N 19/42; H04N 19/436
USPC .................................................... 375/240.28
See application file for complete search history.

(56) References Cited

U.S. PATENT DOCUMENTS

| 7,697,768 B2* | 4/2010 | Ishiyama | ........... H04N 7/17336 382/232 |
| 2008/0152020 A1 | 6/2008 | Kayashima et al. | |
| 2011/0216819 A1* | 9/2011 | Guyot | ................ H04N 21/2221 375/240.02 |

FOREIGN PATENT DOCUMENTS

| JP | 7-7730 | 1/1995 |
| JP | 8-79701 | 3/1996 |
| JP | 10-234043 | 9/1998 |
| JP | 11-239347 | 8/1999 |
| JP | 2000-338944 | 12/2000 |
| JP | 2005-301131 | 10/2005 |

(Continued)

OTHER PUBLICATIONS

Patent Abstracts of Japan, Publication No. 07-007730, published Jan. 10, 1995.

(Continued)

*Primary Examiner* — Allen Wong
(74) *Attorney, Agent, or Firm* — Staas & Halsey LLP

(57) ABSTRACT

An encoding system includes: a plurality of encoding devices that each include an encoding processing unit configured to, at a timing in accordance with a vertical synchronization signal included in a moving picture signal, encode divided image data, wherein one encoding device acts as a single master and the remaining one or more encoding devices act as slave. A main synchronization processing unit configured to be provided in the master, in accordance with the vertical synchronization signal, to transmit a setting signal to the slave to perform setting on the encoding processing unit, so that a start timing of encoding processing by each of the encoding processing units is synchronized in frame image units, and to monitor a synchronization state of the encoding devices based on a state (Continued)

signal representing a state of the encoding processing unit of the ancillary encoding device received from the slave.

15 Claims, 16 Drawing Sheets

(56) References Cited

FOREIGN PATENT DOCUMENTS

| | | |
|---|---|---|
| JP | 2008-90080 | 4/2008 |
| JP | 2008-166862 | 7/2008 |

OTHER PUBLICATIONS

Patent Abstracts of Japan, Publication No. 08-079701, published Mar. 22, 1996.
Patent Abstracts of Japan, Publication No. 10-234043, published Sep. 2, 1998.
Patent Abstracts of Japan, Publication No. 11-239347, published Aug. 31, 1999.
Patent Abstracts of Japan, Publication No. 2000-338944, published Dec. 8, 2000.
Patent Abstracts of Japan, Publication No. 2005-301131, published Oct. 27, 2005.
Patent Abstracts of Japan, Publication No. 2008-090080, published Apr. 17, 2008.
Patent Abstracts of Japan, Publication No. 2008-166862, published Jul. 17, 2008.
International Search Report mailed Jul. 3, 2012, in corresponding International Patent Application No. PCT/JP2012/057946.

* cited by examiner

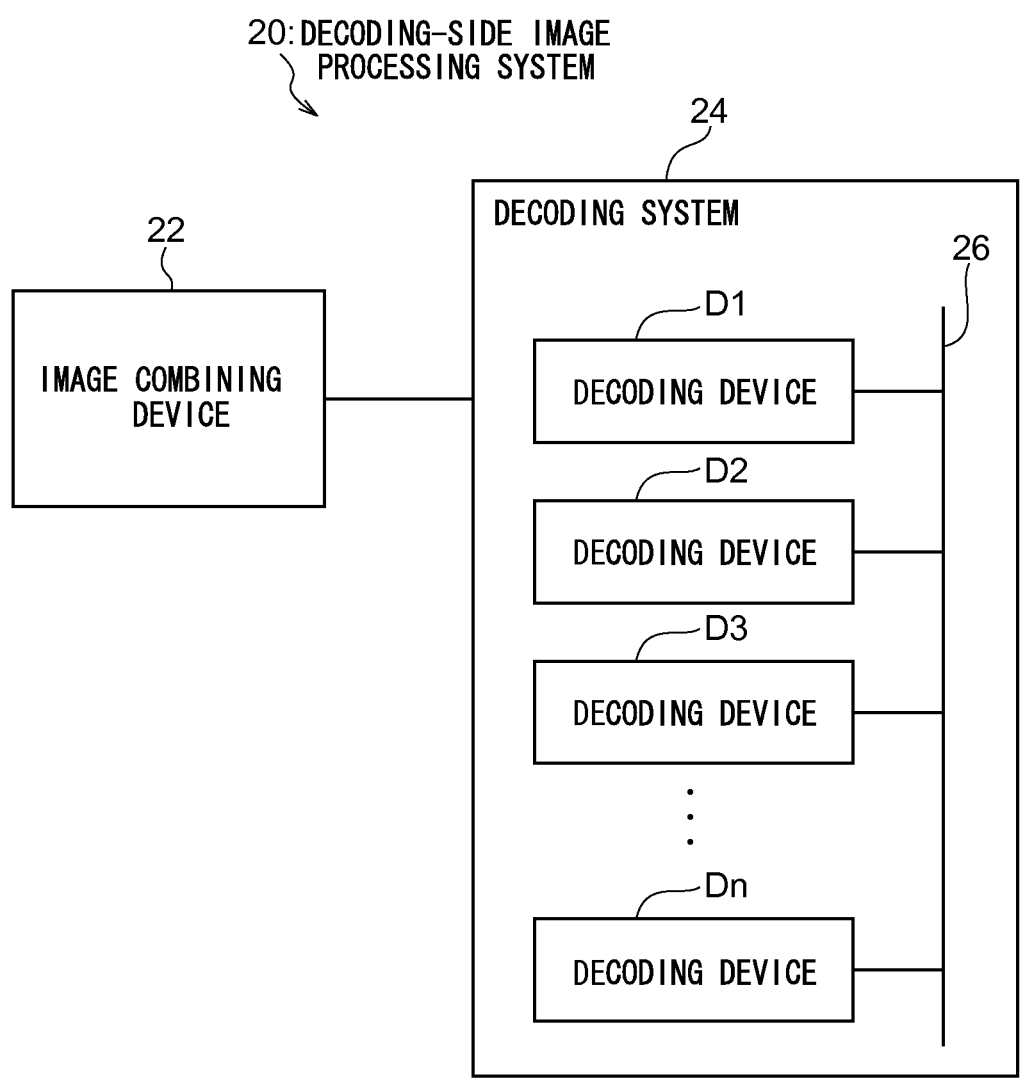

FIG.2
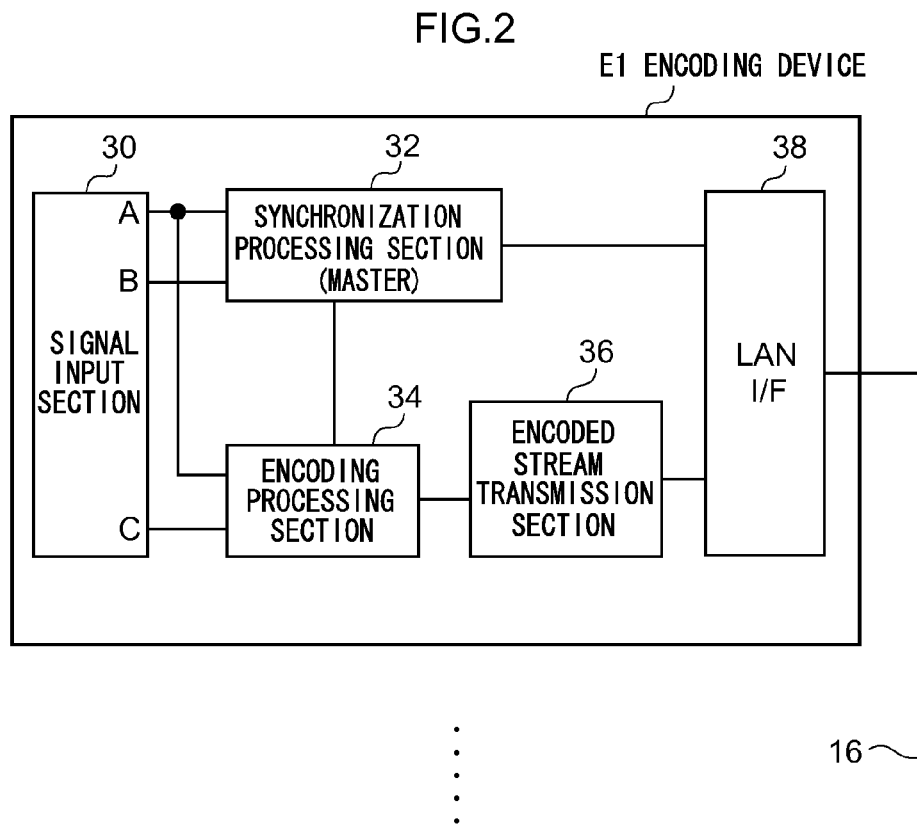
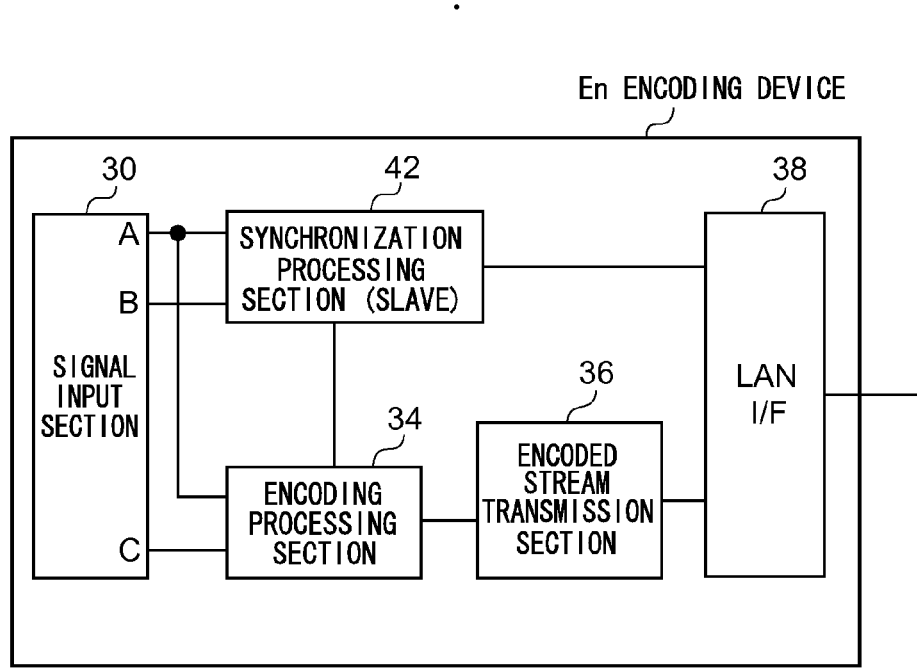

ENCODING SYSTEM, DEVICE, AND
METHOD

CROSS-REFERENCE TO RELATED
APPLICATION

This application is a continuation application of International Application No. PCT/JP/2012/057946, filed Mar. 27, 2012, the disclosure of which is incorporated herein by reference in its entirety.

FIELD

The embodiments discussed herein are related to an encoding system, an encoding device, an encoding method, and a computer-readable storage medium recorded with a program.

BACKGROUND

Various technology is known for transmitting various moving pictures (video images), such as, for example, High Definition (HD) moving pictures and moving pictures of high resolution exceeding that of HD moving pictures.

For example, in order to combine plural display devices for display as a single screen, there is a proposal to divide frame images multiple times, to encode the image data for each of the divided images using respective encoding devices, and to adjust the transmission timing for each of the encoded data.

A method is also known for, when encoding, encoding and transmitting image data for each divided image arising from dividing a frame image multiple times by utilizing plural existing encoding devices. Such cases enable a lower cost system to be configured than developing customized devices, due to being able to employ existing encoding devices.

RELATED PATENT DOCUMENTS

Japanese Laid-open Patent Publication No. 2008-090080

SUMMARY

According to an aspect of the embodiments, an encoding system includes:

a plurality of encoding devices that each include an encoding processing unit configured to, at a timing in accordance with a vertical synchronization signal included in a moving picture signal, encode divided image data arising when a frame image unit of image data included in the moving picture signal is divided into a plurality of divided image data, wherein one of the encoding devices acts as a single main encoding device and the remaining one or more encoding devices act as one or more ancillary encoding devices;

a main synchronization processing unit configured to be provided in the main encoding device, —in accordance with the vertical synchronization signal, to transmit a setting signal to the ancillary encoding device to perform setting on the encoding processing unit, so that a start timing of encoding processing by each of the plurality of encoding processing units and a switching timing of an encoding parameter are synchronized in frame image units, and to monitor a synchronization state of the plurality of encoding devices based on a state signal representing a state of the encoding processing unit of the ancillary encoding device received from the ancillary encoding device; and an ancillary synchronization processing unit configured to be provided at the ancillary encoding device, to perform setting of the in-device encoding processing unit according to the setting signal received from the main encoding device, and to transmit a state signal representing a state of the in-device encoding processing unit to the main encoding device.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1B is a configuration diagram of a decoding-side image processing system according to an exemplary embodiment;

FIG. 2 is a functional configuration diagram of encoding devices;

DESCRIPTION OF EMBODIMENTS

Hitherto, in methods employing plural encoding devices, due to individual differences in the power ON timing and time required for activation of each of the encoding devices, there is sometimes variation in the activation completion timing such that the encoding start timing of each of the encoding devices is not synchronized. Moreover, it is desirable to dynamically change encoding parameters to match the characteristics of the input moving picture in order to raise the moving picture quality. However, in known devices, it has not been possible to switch encoding parameters at the same timing in plural encoding devices, even though a dynamic change in encoding parameters is desired.

Figure 15:
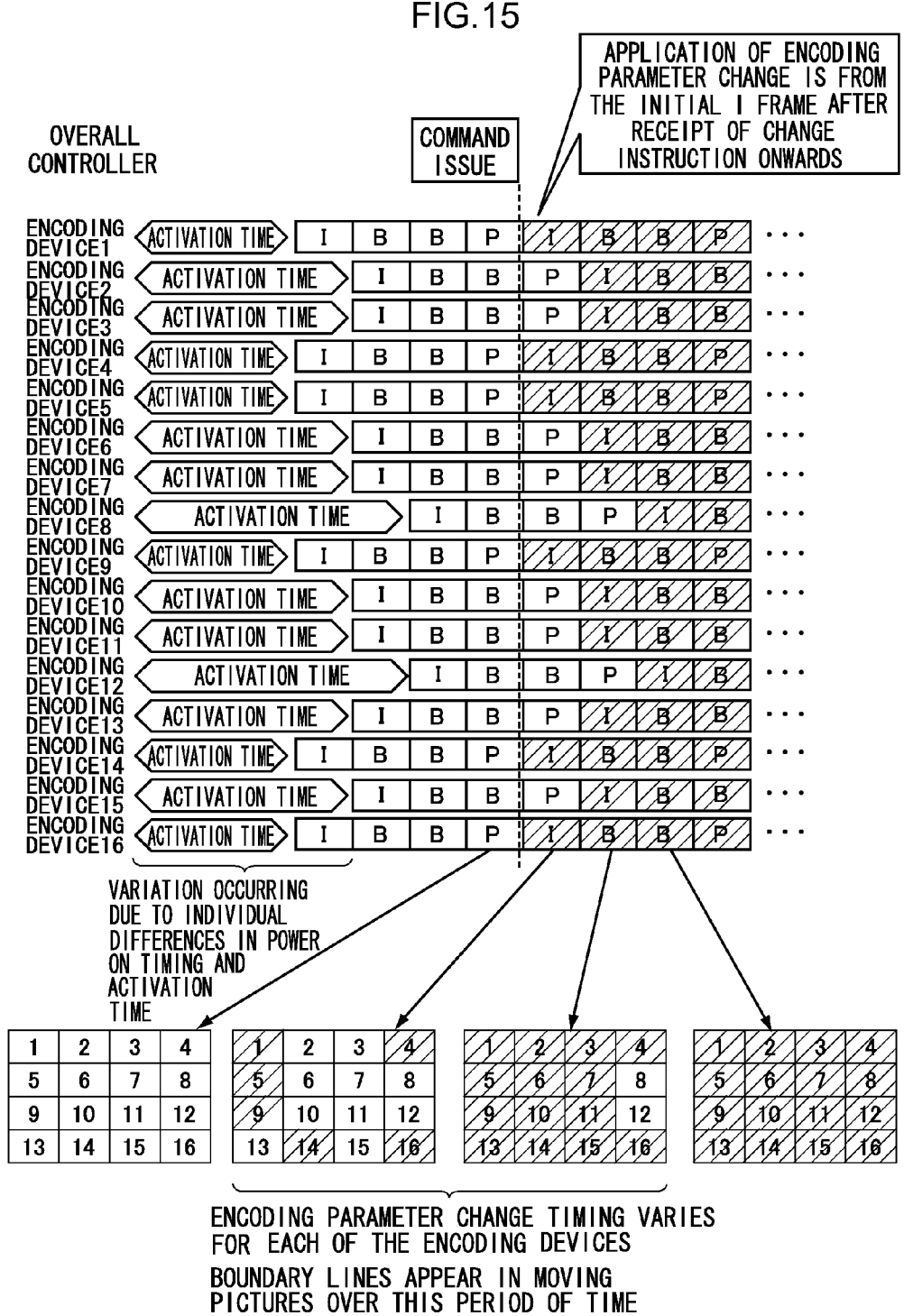
FIG. 15 is an explanatory diagram to explain conventional technology in which encoding start timing is not synchronized between plural encoding devices, and so synchronization is not achieved for switching of encoding parameters.

FIG. 15 illustrates an example in which the encoding start timings are not synchronized between plural encoding devices, and switching of the encoding parameters is not synchronized. An example is illustrated here of encoding devices that perform encoding using a Moving Picture Experts Group (MPEG) method that has 3 types of frame, I frames, P frames, and B frames. As illustrated in FIG. 15, a frame group encoded by the MPEG method has a Group of Pictures (GOP) structure in which a collection of frames, from one I frame to the frame one before the next I frame, is treated as a single group. When the encoding parameters have been changed, the encoding parameters after the change are applied from the leading I frame of a group onward. Consequently, if synchronization is not achieved between each of the encoding devices, then variation will occur in the application timing of the encoding parameters even if, for example, a command to switch encoding parameters is externally transmitted (from the overall controller in FIG. 15) at the same time to each of the encoding devices.

When decoding and combining plural image data encoded in this manner, an issue arises that a method to dynamically optimize the encoding parameters is not usable due to deterioration in moving picture quality occurring, such as prominent boundaries between image divisions that accompany changes to the encoding parameters.

As a method to synchronize between encoding devices, a method might be considered of providing a dedicated synchronization interface at each of the encoding devices, and externally transmitting processing commands to start encoding processing and processing commands to change encoding parameters, and a synchronization signal, directly to each of the encoding devices.

However, such a method would raise costs compared to a method implemented by encoding processing utilizing existing encoding devices, due to the requirement to provide additional dedicated synchronization interfaces not required during independent operation of each of the encoding devices.

In a system employed to synchronize plural encoding devices, hitherto, there has only been viewing of the decoded moving picture on the decoding device side as a method to confirm whether or not normal synchronization has been achieved in all the encoding devices. This means that it is not possible to quickly respond when abnormalities occur.

Detailed explanation follows regarding an exemplary embodiment of technology disclosed herein, with reference to the drawings.

Figure 1A:
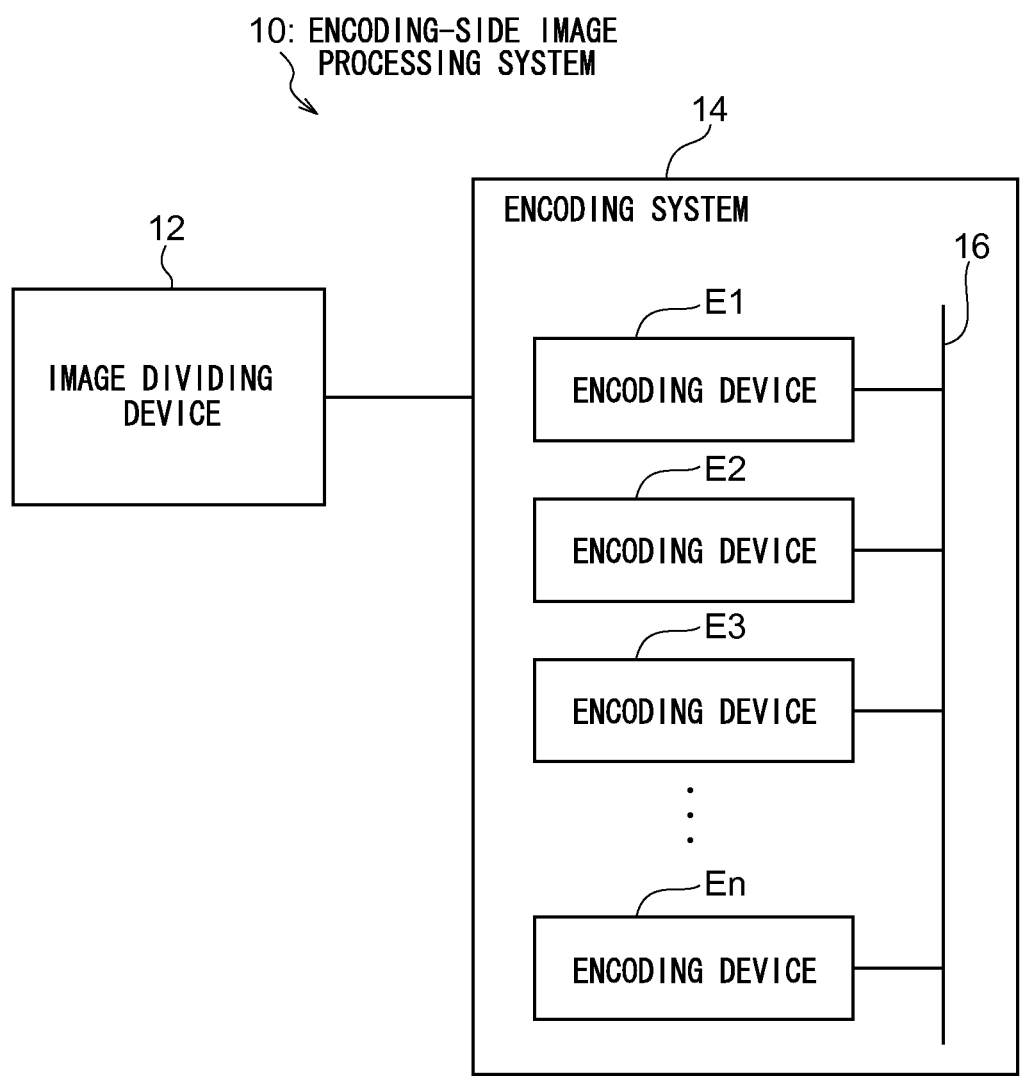
FIG. 1A is a configuration diagram of an encoding-side image processing system according to an exemplary embodiment.

FIG. 1A illustrates an encoding-side image processing system 10 according to the present exemplary embodiment. The encoding-side image processing system 10 includes an image dividing device 12 and an encoding system 14. The image dividing device 12 acquires a moving picture signal including image data for plural image frames, a vertical synchronization signal, and a horizontal synchronization signal. The moving picture signal may be a signal for a High Definition (HD) moving picture, may be a signal for a Standard Definition (SD) moving picture, or may be a signal for a moving picture of higher definition than an HD moving picture. The image dividing device 12 divides the image data of image frames included in the moving picture signal into plural (in this case n individual, where n is an integer of 2 or more) image data (referred to below as divided image data). The image dividing device 12 generates a moving picture signal including divided image data, a vertical synchronization signal, and a horizontal synchronization signal for each of the divided n individual divided image data. The moving picture signal generated by the image dividing device 12 is referred to below as a divided image signal, in order to differentiate from the moving picture signal prior to division of the image data by the image dividing device 12.

The encoding system 14 includes n individual encoding devices E1 to En that are connected to each other through a Local Area Network (LAN) 16. The encoding system 14 acquires the n individual divided image signals generated by the image dividing device 12, and each of the divided image data included in the n individual divided image signals is encoded by the n individual encoding devices E1 to En.

In the present exemplary embodiment explanation is given of an example in which the n individual encoding devices E1 to En each include a general purpose LAN Interface (I/F) 38 (described below), and two-way communication is performed via the LAN 16 that is one type of communication method. However the communication method is not limited to the LAN 16. As described below, a general purpose communication method may be adopted that is capable of two-way communication between an encoding device acting as a master (main encoding device) and each of the encoding devices acting as slaves (ancillary encoding devices).

FIG. 1B illustrates a decoding-side image processing system 20 according to the present exemplary embodiment. The decoding-side image processing system 20 includes an image combining device 22 and a decoding system 24. The decoding system 24 includes n individual decoding devices D1 to Dn that are connected to a LAN 26. The n individual divided image data encoded by the encoding-side image processing system 10 are input to the decoding devices D1 to Dn via the LAN 26, and the n individual divided image data are decoded by the n individual decoding devices D1 to Dn. Explanation is given here regarding an example in which the communication method to input the divided image data to the n individual decoding devices D1 to Dn is via the LAN 26; however, the communication method to input the divided image data to the n individual decoding devices D1 to Dn is not limited to the LAN 26. The image combining device 22 combines the n individual divided image data decoded by the decoding system 24 and generates a single frame image.

FIG. 2 is a functional configuration diagram of the encoding devices E1 to En.

In the present exemplary embodiment, one encoding device out of the n individual encoding devices E1 to En operates as the master (in this case the encoding device E1), and the other encoding devices operate as slaves (in this case the encoding devices E2 to En).

As illustrated in FIG. 2, the encoding device E1 operating as the master includes a signal input section 30, a synchronization processing section 32, an encoding processing section 34, an encoded stream transmission section 36, and a LAN I/F 38.

The divided image signal containing the divided image data, the vertical synchronization signal, and the horizontal synchronization signal, is input to the signal input section

30. The signal input section 30 includes an A terminal, a B terminal, and a C terminal. The signal input section 30 outputs the vertical synchronization signal extracted from the divided image signal from the A terminal, outputs a count value counting the horizontal synchronization signal extracted from the divided image signal in frame image units from the B terminal, and outputs the divided image data from the C terminal.

The vertical synchronization signal output from the A terminal of the signal input section 30, and the count value of the number of lines input from the B terminal of the signal input section 30, are input to the synchronization processing section 32.

The synchronization processing section 32 transmits a setting signal to the slaves to perform setting on the encoding processing section 34 such that the encoding processing start timing by the encoding processing section 34 of the n individual encoding devices E1 to En, and the switching timing of encoding parameters, are synchronized by frame image unit. At this point the synchronization processing section 32 transmits the setting signal at a timing in accordance with the vertical synchronization signal. The synchronization processing section 32 also performs setting of the in-device encoding processing section 34.

The synchronization processing section 32 also receives a state signal representing the state of the encoding processing section 34, such as the setting state and encoding processing results of the encoding processing section 34, from the encoding devices E2 to En acting as slaves. Data representing the processing result of encoding processing (encoding processing result data) is also input to the synchronization processing section 32 from the in-device encoding processing section 34. The synchronization processing section 32 thereby monitors the synchronization state of encoding processing of the n individual encoding devices E1 to En.

The encoding processing section 34 sets an encoding start timing and encoding parameters using the synchronization processing section 32. The vertical synchronization signal output from the A terminal of the signal input section 30, and the divided image data output from the C terminal thereof, are input to the encoding processing section 34. The encoding processing section 34, at a timing in accordance with the vertical synchronization signal, performs encoding processing on the divided image data according to setting by the synchronization processing section 32. In the present exemplary embodiment, the encoding processing section 34 performs encoding processing with a Moving Picture Experts Group (MPEG) format. However there is no limitation thereto and, for example, encoding may be performed by encoding with an H.26 series encoding method, such as H.264.

A specific example of an encoding parameter the encoding processing section 34 employs here in encoding processing is, for example, a parameter representing resolution. For a complicated picture of a moving picture, a drop in resolution tends to be less easily noticeable, even when the resolution is lowered. However, for a simple picture of a moving picture, a drop in resolution tends to be readily discerned. Due to the resolution becoming lower the higher the compression ratio, the compression ratio may be set according to the complexity (roughness) of the input moving picture signal.

For example, prior to encoding the divided image data in the encoding system 14, the complexity of each of the frame images of the moving picture signal may be ascertained in advance by image processing, and the encoding device E1 may then separately acquire the ascertained result so as to derive a compression ratio. For example, a storage section may be provided in the encoding device E1, stored with a table recording associated values representing the complexity and predetermined compression ratios, and the compression ratio may then be derived with reference to the storage section. Each of the encoding devices E1 to En may perform picture recognition, derive the complexity, and the encoding device E1 may acquire data representing the complexity to determine the compression ratio. A compression ratio may be input to the encoding device E1 as an encoding parameter from an external device.

In regard to moving pictures with rapid movement, and moving pictures with slow movement, there is a tendency for a gradual drop in resolution to be less easily noticeable in moving pictures with rapid movement. Thus, similarly to as described above, the compression ratio may be derived, as an encoding parameter according to the movement of the moving picture represented in the moving picture signal.

Moreover, in MPEG format there are 3 types of frame for encoded frames, these being I frames, B frames, and P frames.

I frames are frames encoded by an intra-screen prediction encoding method, utilized when there is a high correlation in the spatial direction of video image data. Namely, an intra-screen prediction encoding method is a method in which the encoding target frame image is encoded using only the data of the frame image being subjected to encoding, without employing other frame images. Intra-screen prediction encoding methods are also sometimes referred to as "intra-frame prediction encoding methods".

B frames and P frames are employed for frames encoded by inter-screen prediction encoding methods, with a high correlation in the time direction of video image data. Since video image data generally has a high degree of similarity between frame images that are close to each other in time, encoding of the encoding target frame image is performed with reference to a decoded image that has been decoded from an already encoded frame image, enabling redundancy to be removed. Inter-screen prediction encoding methods are sometimes referred to as "inter-frame prediction encoding methods". For P frames, inter-frame prediction in one direction is performed from a past frame, and the difference encoded. For B frames, inter-frame prediction in two directions is performed from two frames, a past and a future frame, and the differences encoded. B frames have the highest compression ratio out of the 3 types of frame.

Due to B frames and P frames being encoded by employing already encoded frames, encoding processing is based on frame group units containing a single I frame, referred to as a Group Of Pictures (GOP). Due to the data volume being smaller for P frames and B frames than for I frames, the total data volume can be reduced as the GOP length is made longer (the greater the number of P frames and B frames). However, error becomes larger if the GOP length is too long, leading to a deterioration in image quality for moving pictures with rapid movement. Therefore, adjustment may be made according to the speed of movement, such as a change from a frame structure "IBBP" to a frame structure without B frames of "IPPP", or a change to reduce the number of B frames and shorten the GOP length in an "IBP" fame structure.

As explained above, encoding processing is performed in a encoding processing section 34 according to the set encoding parameters by setting the encoding parameters, such as compression ratio, resolution, GOP length, and frame structure, in the encoding processing section 34.

The encoding processing section 34 outputs data representing processing results of encoding processing (encoding processing result data) to the synchronization processing section 32.

The encoded stream transmission section 36 outputs divided image data that has been encoding processed by the encoding processing section 34 to an external device via the LAN I/F 38.

The LAN I/F 38 is a general purpose interface for two-way communication between devices connected to the LAN 16.

The encoding devices E2 to En operating as slaves (only the encoding device En is illustrated in FIG. 2) include a signal input section 30, a synchronization processing section 42, an encoding processing section 34, an encoded stream transmission section 36, and a LAN Interface (I/F) 38. Configuration similar to that of the configuration contained in the encoding device E1 is allocated the same reference numerals and further explanation thereof is omitted. Explanation focuses on the synchronization processing section 42.

The vertical synchronization signal output from the A terminal of the signal input section 30, and a count value of the number of lines input from the B terminal of the signal input section 30, are input to the synchronization processing section 42. A setting signal received from the encoding device E1 through the LAN I/F 38 is also input thereto.

The synchronization processing section 42 performs setting of the in-device encoding processing section 34 according to a setting signal received from the encoding device E1. Data representing processing results of encoding processing from the in-device encoding processing section 34 (encoding processing result data) is also input to the synchronization processing section 42. The synchronization processing section 42 transmits a state signal, representing the state of the in-device encoding processing section 34, to the encoding device E1 via the LAN I/F 38.

Figure 3:
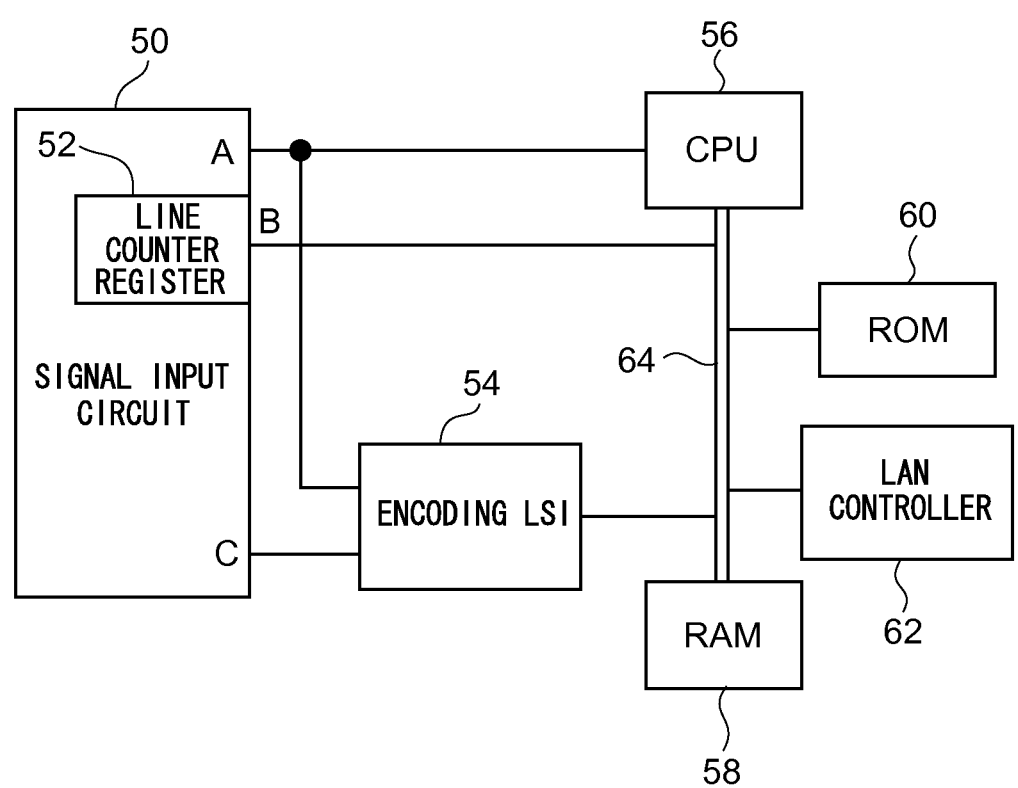
FIG. 3 is a hardware configuration diagram of an encoding device.

FIG. 3 is a hardware configuration diagram for the encoding devices E1 to En.

As illustrated in FIG. 3, the encoding devices E1 to En include a Central Processing Unit (CPU) 56. The CPU 56 is connected through a CPU bus 64 to a signal input circuit 50, an encoding Large Scale Integration (LSI) 54, Random Access Memory (RAM) 58, Read Only Memory (ROM) 60, and a LAN controller 62.

The signal input circuit 50 is a circuit to implement the signal input section 30 of FIG. 2. A line counter register 52 is provided in the signal input circuit 50. A horizontal synchronization signal extracted from the divided image signal is input to the line counter register 52. The line counter register 52 counts the input horizontal synchronization signal in frame image units, holds the counted count value in the register, and outputs the held count value to the B terminal. The signal input circuit 50 extracts the vertical synchronization signal from the input divided image signal for output from the A terminal, and extracts divided image data from the divided image signal for output from the C terminal.

The encoding LSI 54 is hardware equipped with the functions of the encoding processing section 34 and the encoded stream transmission section 36 in FIG. 2. The LAN controller 62 is hardware equipped with the function of the LAN I/F 38 of FIG. 2.

The RAM 58 is employed as working memory of the CPU 56 or the like. The ROM 60 is a recording medium recorded with a synchronization processing program executed by the CPU 56. The CPU 56 of the encoding device E1 operates as the synchronization processing section 32 illustrated in FIG. 2 by the CPU 56 executing a master synchronization processing program recorded in the ROM 60. The CPU 56 of the encoding devices E2 to En operates as the synchronization processing section 42 of FIG. 2 by the CPU 56 executing a slave synchronization processing program recorded in the ROM 60.

Explanation next follows regarding operation of the encoding system 14 of the present exemplary embodiment. In the following, a setting signal transmitted (issued) by the encoding device E1 is referred to as a "command". Explanation follows regarding examples of two types of the state signal transmitted by the encoding devices E2 to En: a setting notification signal that notifies that setting on the encoding processing section 34 is complete, and an encoding processing notification signal that notifies that encoding processing of the encoding processing section 34 is complete. In the following, the setting notification signal is simply referred to as "setting notification", and the encoding processing notification signal is simply referred to as "encoding processing notification".

Figure 4:
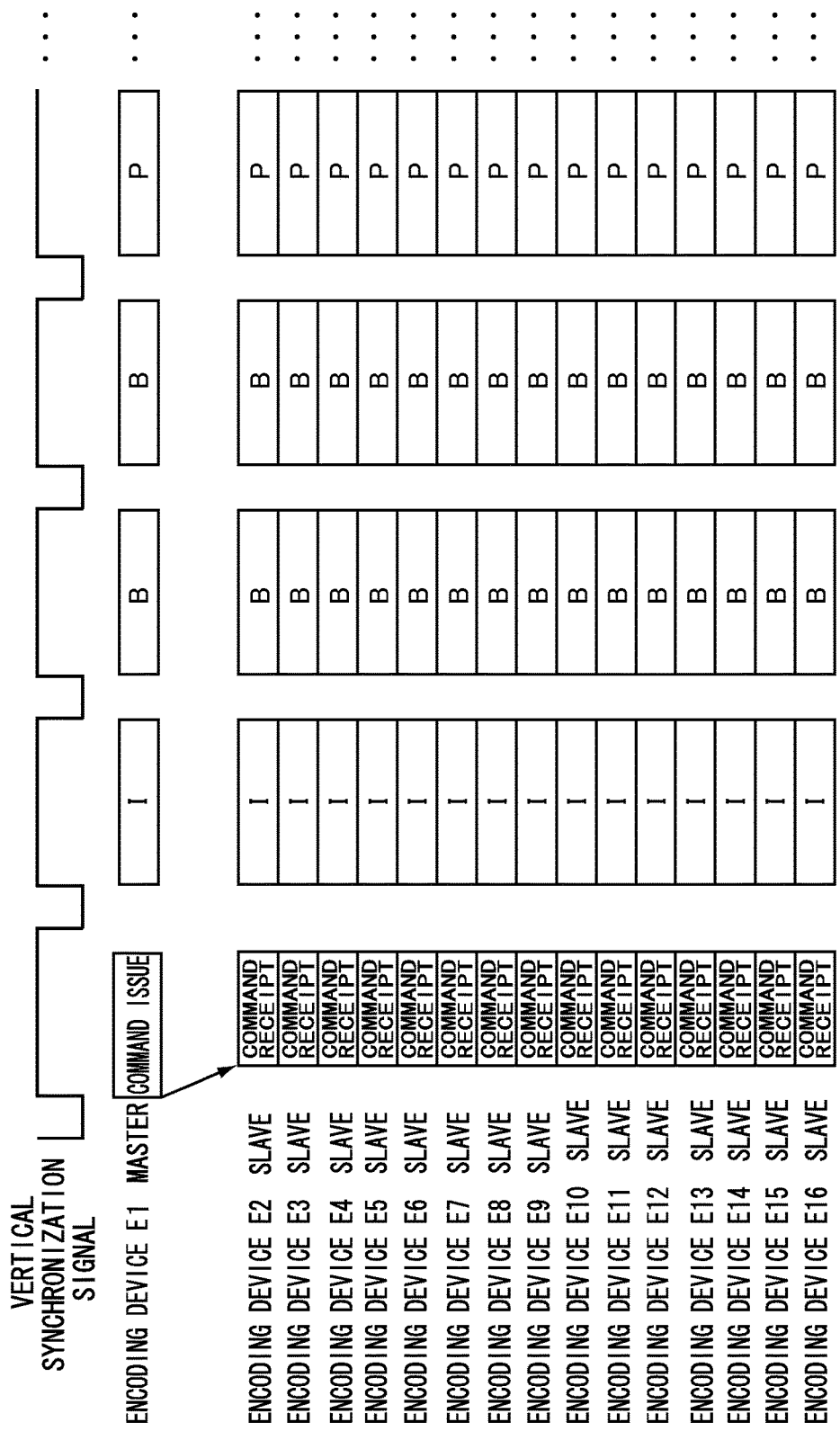
FIG. 4 is a schematic explanatory diagram of the operation of an encoding system of the present exemplary embodiment.

As illustrated in FIG. 4, in the encoding system 14 of the present exemplary embodiment, at a timing in accordance with the vertical synchronization signal, a command is issued from the encoding device E1, serving as the master, to the encoding devices E2 to En, serving as slaves. In this case the vertical synchronization signal is an L level pulse signal. In the present exemplary embodiment, the encoding device E1 uses the timing at which the vertical synchronization signal drops from H level to L level as the trigger to generate the command, and then issues the generated command. The command issued from the encoding device E1 is a command to set the encoding processing start timing, or is a command to set switching of the encoding parameters.

During normal operation, after the command has been issued, the encoding devices E2 to En (explanation follows regarding an example in which n=16) receive the command over the interval until input of the next vertical synchronization signal, and set the encoding processing sections 34 according to the command. The encoding device E1 issues the command and also performs setting of the in-device encoding processing section 34.

In FIG. 4, the command reception timing is the same for the encoding devices E2 to E16, however this merely schematically illustrates command reception processing of the encoding devices E2 to E16, and there is no guarantee that the command reception timings will actually be the same as each other.

The encoding processing sections 34 start encoding processing of the respective divided image data using input of the vertical synchronization signal as the trigger. In the present exemplary embodiment, at the timing of the falling edge of the vertical synchronization signal input after the command was issued, each of the encoding processing sections 34 of the encoding devices E1 to E16 performs encoding processing on the respective input divided image data according to setting performed all at once in accordance with the command.

In the present exemplary embodiment, the period from when a given vertical synchronization signal is input to when the next vertical synchronization signal is input is the period of time for encoding 1 frame's worth of image data, and this duration is referred to as the frame period.

As illustrated in FIG. 4, the settings of the command are applied and encoding processing of each of the encoding processing sections 34 is started from an I frame period that is one after the frame period during which the command was issued. Then encoding processing, in which the set encoding parameters are applied, continues until the next command to switch the encoding parameters is issued.

Although omitted from illustration in the drawings, sometimes there is some variation in the activation completion timing in each of the encoding devices E1 to E16, due to variation in the power ON timing of each of the encoding devices, and individual differences in the time required to activate. Thus, after the encoding devices E1 to E16 have been activated, a command is accordingly output from the encoding device E1 to set the encoding start timing for each of the encoding processing sections 34 in each of the encoding devices E2 to E16. This command is output after a timing at which it is estimated that activation of all the encoding devices E1 to E16 has been completed for all of the encoding devices E1 to E16, in consideration of the variation in activation completion timing. The encoding devices E2 to E16 set the encoding start timing of the in-device encoding processing section 34 in accordance with the command. The encoding device E1 issues the command, and also sets the encoding start timing of the in-device encoding processing section 34.

After issuing the command to set the encoding start timing, the setting commanded is applied, and encoding processing of each of the encoding processing sections 34 is started, from the frame period one after the frame period during which the command is issued. After activation, each of the encoding devices E1 to E16 accordingly adopts a standby state, until the command to set the initial encoding start timing is output from the encoding device E1. Data related to encoding parameter setting may be included in, and output with, the command to set the encoding start timing. Before the next frame period, the encoding devices E2 to E16 set the encoding parameters for the in-device encoding processing sections 34 according to the data included in the command. Default encoding parameters stored in the encoding processing section 34 may be applied in cases in which data related to encoding parameter setting is not included in the command to set the encoding start timing.

In the present exemplary embodiment, monitoring of the synchronization state of the encoding devices E1 to E16 is performed autonomously, without intervention of an external device. Explanation follows regarding a specific example regarding command issue and monitoring of synchronization state.

Figure 5:
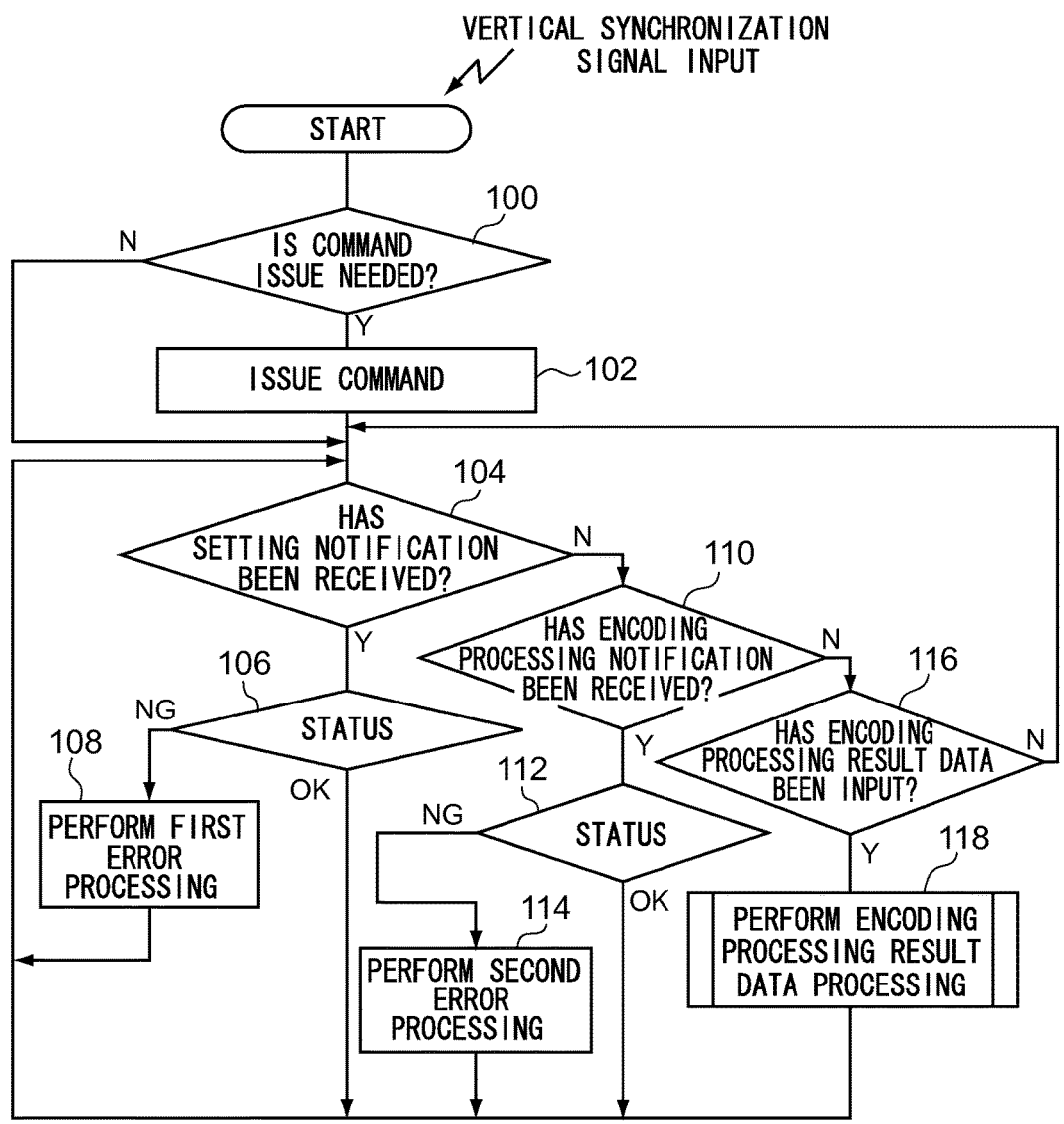
FIG. 5 is a flow chart of synchronization processing routine executed by a synchronization processing section of a master encoding device.

FIG. 5 is a flow chart illustrating a synchronization processing routine executed by the synchronization processing section 32 of the encoding device E1. This synchronization processing routine is started at the timing the vertical synchronization signal is input.

At step 100, the synchronization processing section 32 determines whether or not it is necessary to issue a command in the current frame period. For example, directly after power ON and activation of the encoding system 14, a command needs to be issued to each of the slaves to set the encoding processing start timing to start encoding processing. Moreover, if it is determined that there is a need to change the encoding parameters, such as, for example, in accordance with the movement speed of objects contained in the moving picture or the complexity of the moving picture, ascertained for example by image processing, then a command needs to be issued to the slaves to change the encoding parameters.

An example is given here in which the necessity of command issue is determined by the master encoding device E1 according to whether or not it is currently directly after activation, or according to ascertained results by image processing; however, configuration may be made such that determination is made by any of the encoding devices E1 to E16. Instruction data instructing a forced change in the encoding parameters may be input to the encoding system 14 from an external device, such that the input result is input to the synchronization processing section 32 of the encoding device E1.

If affirmative determination is made at step 100, then the synchronization processing section 32 generates and issues the command that needs to be issued (in the present exemplary embodiment, the command to set the encoding start timing, or the command to set the encoding parameters) at step 102. To enable utilization for synchronization control, the encoding device E1 may generate a command that includes an identification number to identify the command.

If negative determination is made at step 100, the synchronization processing section 32 then skips step 102.

At step 104, the synchronization processing section 32 determines whether or not setting notification has been received from the slave encoding devices E2 to E16. If affirmative determination is made at step 104, then the synchronization processing section 32 stores a status containing the setting notification in a predetermined storage region at step 106, and then confirms the contents thereof.

Cases in which the status is OK (pass) indicate that, in the slave that transmitted the setting notification, setting on the encoding processing section 34 according to the command issued in the current frame period has ended normally in the current frame period. The synchronization processing section 32 accordingly returns to step 104, without performing error processing.

Cases in which the status included in the setting notification is NG (fail) indicate that, in the slave that transmitted the setting notification, setting according to the command has not ended normally within the frame period in which the command was issued. A first error processing is accordingly executed at step 108.

As first error processing, configuration may be made such that, for example, the encoding processing of all the encoding devices E1 to E16 is temporarily stopped, and retry processing is performed, such as re-issuing a command to perform re-setting of the setting deemed NG Configuration may be made to notify a system controller of the encoding-side image processing system 10 that an abnormality has occurred.

Moreover, if negative determination is made at step 104, then at step 110 the synchronization processing section 32 determines whether or not an encoding processing notification has been received. If affirmative determination is made at step 110, then at step 112 the synchronization processing section 32 ascertains the status included in the encoding processing notification.

Cases in which the status is indicated to be OK (pass) indicate that, in the slave that transmitted the encoding processing notification, encoding of the divided image data of the frame to be executed in the current frame period has ended normally in the current frame period. The synchronization processing section 32 accordingly returns to step 104 without performing error processing.

Cases in which the status contained in the encoding processing notification is indicated as NG (fail) indicate that, in the slave that transmitted the setting notification, encoding of the divided image data has not ended normally in the frame period during which encoding of the divided image data should be executed. Second error processing is accordingly executed at step 114.

As the second error processing, configuration may be made, for example, such that the encoding processing of all the encoding devices E1 to E16 is temporarily stopped, and retry processing is performed, such as re-issuing a command to re-perform the encoding processing of the frame deemed NG. Configuration may be made to notify the system controller of the encoding-side image processing system 10 that an abnormality has occurred.

If negative determination is made at step 110, the synchronization processing section 32 proceeds to step 116, and determines whether or not encoding processing state data has been input from the in-device encoding processing section 34. The synchronization processing section 32 returns to step 104 if negative determination is made at step 116, and performs encoding processing result data processing of step 118 if affirmative determination is made.

Figure 6:
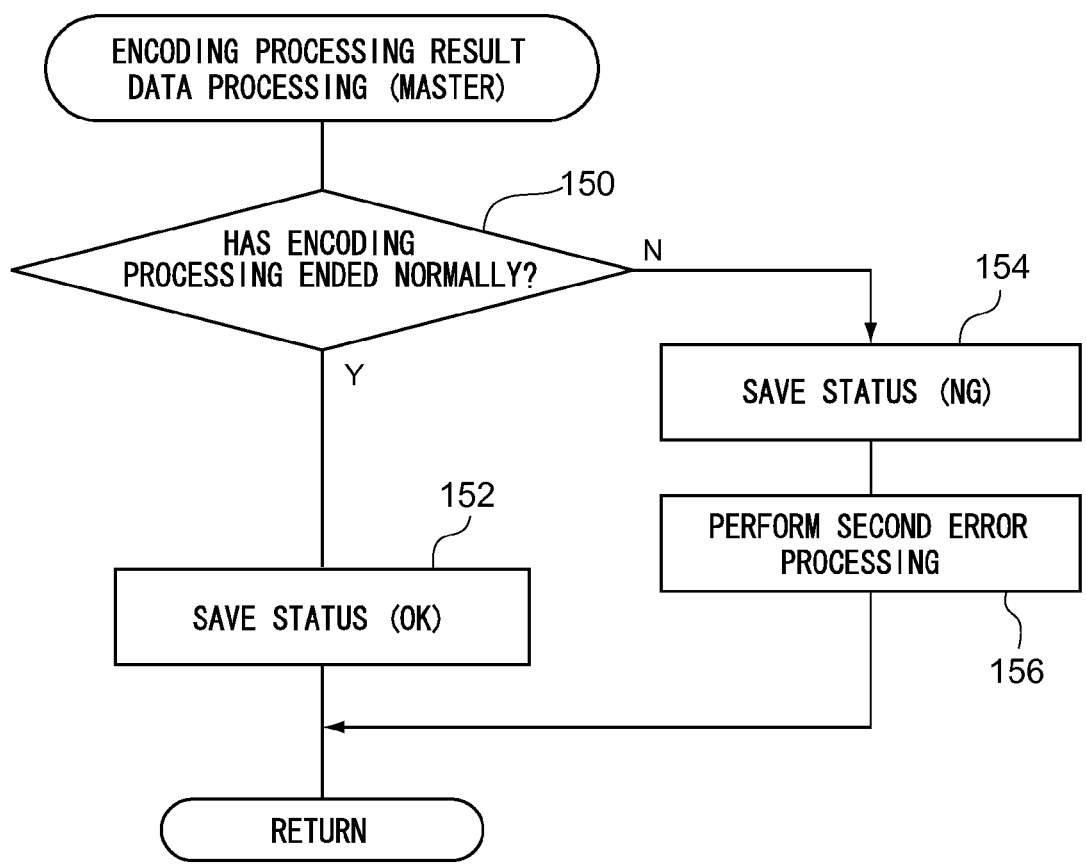
FIG. 6 is a flow chart of an encoding processing result data processing routine executed by a synchronization processing section of a master encoding device.

FIG. 6 is a flow chart of an encoding processing result data processing routine executed by the synchronization processing section 32 of the encoding device E1.

When the encoding processing result data from the in-device encoding processing section 34 is input to the synchronization processing section 32, the synchronization processing section 32 then, at step 150, determines whether or not encoding processing ended normally.

More specifically, in cases in which the encoding processing result data indicates that encoding is complete, the synchronization processing section 32 determines whether or not the encoding processing has been completed by the encoding processing section 34 in the encoding processing of the frame that should have been executed in the current frame period.

Suppose that the frame of the divided image data for which encoding has been completed is the frame that should have been executed in a frame period prior to the current frame period, then determination is made that encoding processing has not ended normally. In cases in which the frame of the divided image data for which encoding has been completed is the frame that should have been executed in the current frame period, then determination is made that encoding processing has ended normally. Also, in cases in which the encoding processing result data indicates encoding failure, the synchronization processing section 32 determines encoding processing has not ended normally to indicate that an abnormality has occurred in one or other of the encoding processing sections 34.

If affirmative determination is made at step 150, then at step 152 the synchronization processing section 32 saves data representing OK (pass) as the status of encoding processing of the in-device encoding processing section 34.

If negative determination is made at step 150, then at step 154 the synchronization processing section 32 saves data representing NG (fail) as the status of encoding processing of the in-device encoding processing section 34. Then at step 156, the synchronization processing section 32 performs the second error processing.

Thus as well as ascertaining the encoding processing status of the encoding processing sections 34 of the encoding devices E2 to E16, the encoding device E1 also ascertains the encoding processing status of the in-device encoding processing section 34, so as to monitor the synchronization state.

The setting result on the in-device encoding processing section 34, such as the encoding parameters, may be ascertained at the point in time of setting by the synchronization processing section 32 itself, and so is omitted from illustration in the drawings.

Figure 7:
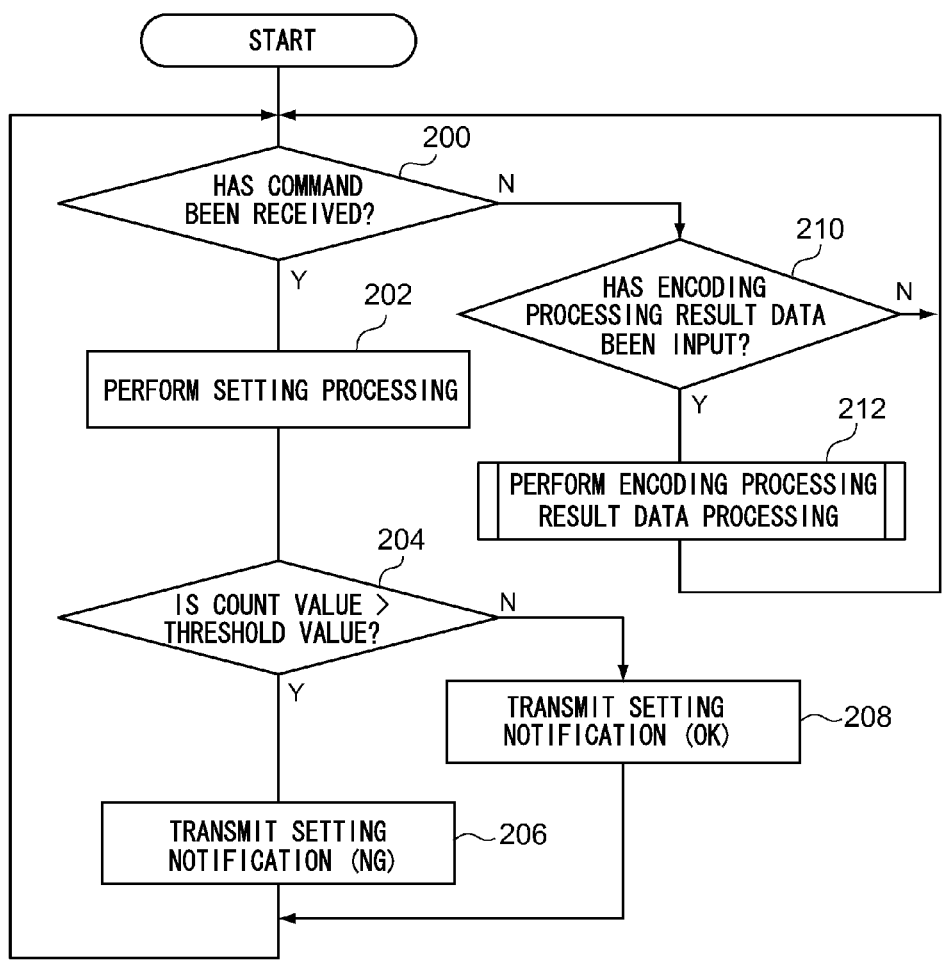
FIG. 7 is a flow chart of a synchronization processing routine executed by a synchronization processing section of a slave encoding device.

FIG. 7 is a flow chart of a synchronization processing routine executed by the synchronization processing section 42 of the encoding devices E2 to E16. The synchronization processing routine is started when the encoding devices E2 to E16 are activated.

At step 200, the synchronization processing section 42 determines whether or not a command has been received from the encoding device E1. If affirmative determination is made at step 200, then at step 202, the synchronization processing section 42 sets the in-device encoding processing section 34 according to the command.

At step 204, the synchronization processing section 42 references the count value most recently output from the B terminal of the signal input section 30, and determines whether or not the count value has exceeded a predetermined threshold value. If the count value exceeds the threshold value, then there is a high possibility that a setting notification will not arrive in the same frame period as that in which the command was issued, even when a setting notification is transmitted to the master encoding device E1 to indicate that setting has been completed for the command. In such circumstances synchronization cannot be confirmed at the master side. If setting processing has been completed at the same time as the end of the frame period in which the command was issued, the encoding processing, that should be started at the same time as the next vertical synchronization signal has been input, is not in time. Thus at step 206, the synchronization processing section 42 generates a setting notification including a status of NG, and transmits the setting notification to the encoding device E1.

Determination at step 204 may be performed by comparing the count value when a command was received at step 200, or when setting processing started, against a predetermined threshold value (this threshold value is smaller than the above threshold value for comparing against the count value at the point of setting completion). For example, there are some cases in which a command from the encoding device E1 arrives delayed by such an amount that does not leave sufficient time to perform the required setting processing in the frame period the command was issued in. In such cases too, a setting notification can be generated with a status of NG if, by comparing the count value when the command was received, or when setting processing started, against a threshold value, the count value is greater than the threshold value. In such cases, the synchronization processing section 42 may transmit the setting notification prior to completing setting. This enables the encoding device E1 to be informed quickly that synchronization is not being achieved.

If the count value is the threshold value or lower at step 204, then, at step 208, a setting notification including a status of OK is generated and transmitted to the encoding device E1.

Note that the encoding devices E2 to E16 may generate and transmit setting notifications that include, in the setting notification, an identification number for the command, to enable the encoding device E1 to determine to which command the setting notification is a response to.

Figure 8:
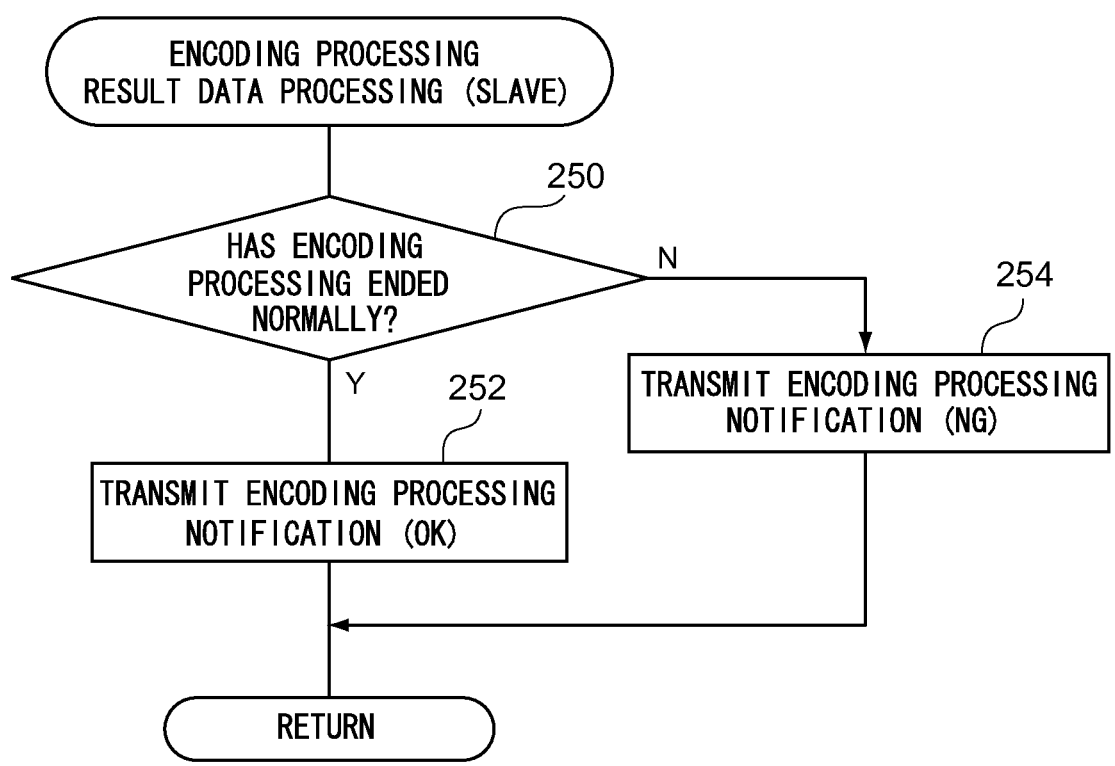
FIG. 8 is a flow chart of an encoding processing result data processing routine executed by a synchronization processing section of a slave encoding device.

If negative determination is made at step 200, the synchronization processing section 42 proceeds to step 210, and determines whether or not encoding processing state data has been input from the in-device encoding processing section 34. The synchronization processing section 42 returns to step 200 when negative determination is made at step 210, and performs encoding processing result data processing of step 212 when affirmative determination is made. FIG. 8 is a flow chart illustrating an encoding processing result data processing routine executed by the synchronization processing section 42 of the encoding devices E2 to E16.

When the encoding processing result data has been input from the in-device encoding processing section 34 to the synchronization processing section 42, then at step 250, the synchronization processing section 42 determines whether or not encoding processing ended normally.

More specifically, in cases in which encoding processing result data indicates encoding completion, the synchronization processing section 42 determines whether or not the encoding processing completed in the encoding processing section 34 was the encoding processing of the frame that should be executed in the current frame period.

Suppose that the frame of the divided image data for which encoding has been completed is the frame that should have been executed in a frame period prior to the current frame period, then determination is made that encoding processing has not ended normally. If the frame of the divided image data for which encoding has been completed is the frame that should have been executed in the current frame period, then determination is made that encoding processing has ended normally. Also, if the encoding processing result data indicates encoding failure, the synchronization processing section 42 determines that encoding processing has not ended normally, to indicate that an abnormality has occurred in one or other of the encoding processing sections 34.

If affirmative determination is made at step 250, then at step 252 the synchronization processing section 42 generates an encoding processing notification including OK (pass) as the status of encoding processing of the in-device encoding processing section 34, and transmits the encoding processing notification to the encoding device E1.

If negative determination is made at step 250, then at step 254 the synchronization processing section 42 generates and transmits an encoding processing notification containing NG (fail) as the status of encoding processing in the in-device encoding processing section 34.

As explained above, the master encoding device E1 is able to monitor the synchronization state of the encoding devices E1 to E16 using the operation of the encoding devices E1 to E16.

Figure 9:
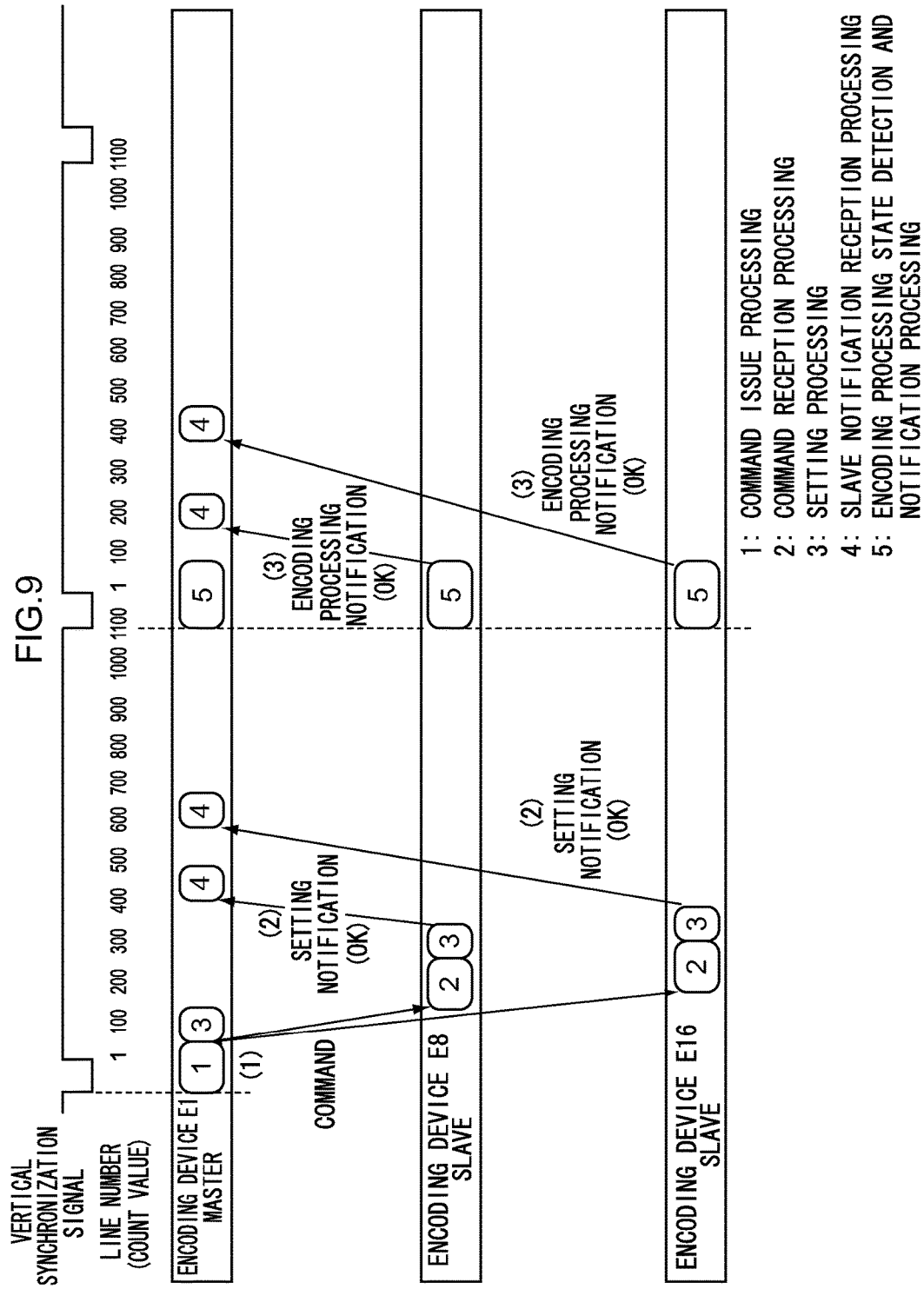
FIG. 9 is a diagram illustrating an example of a timing chart during normal operation.
Figure 10:
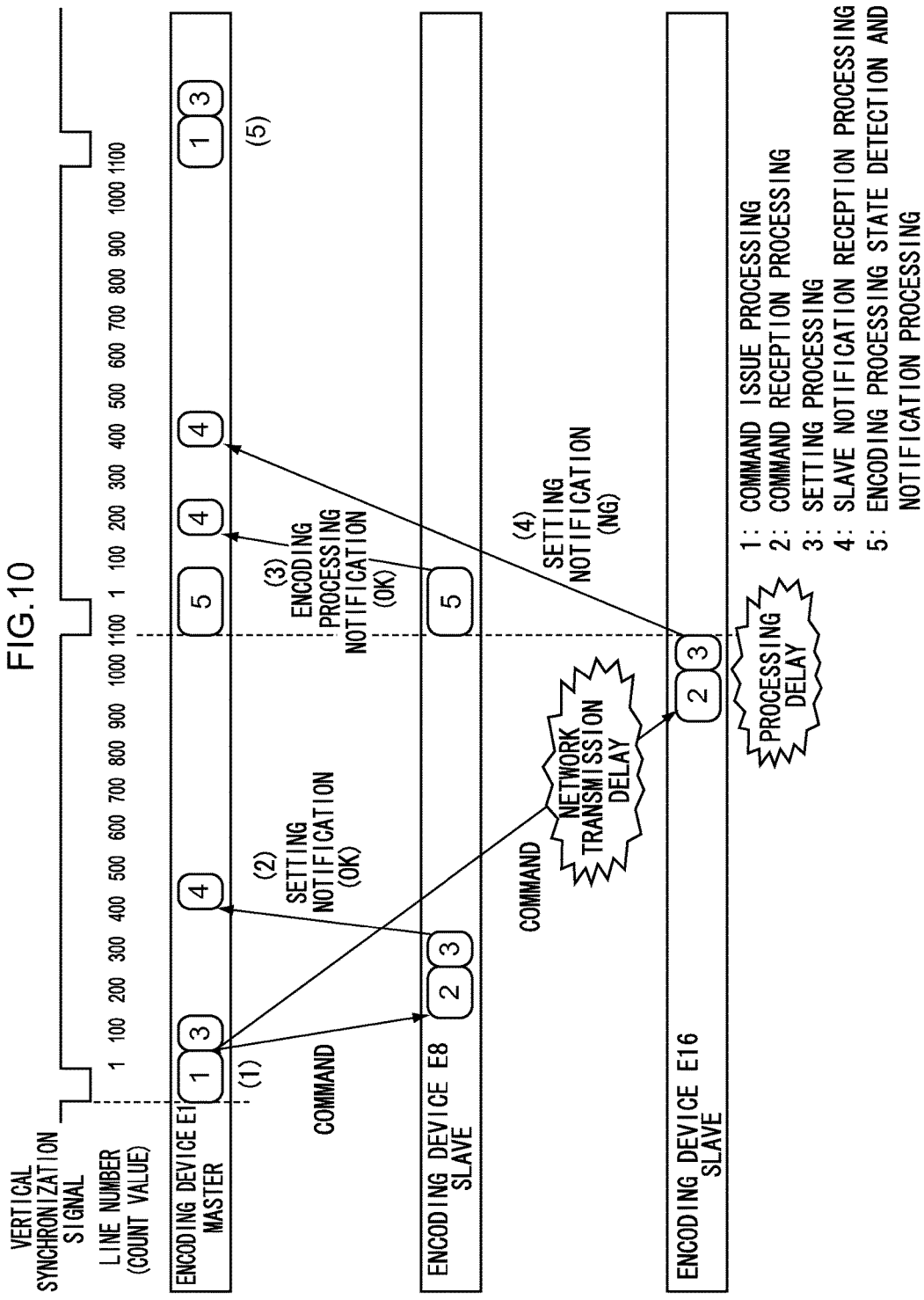
FIG. 10 is a diagram illustrating an example of a timing chart for a case in which an error has occurred at the stage of setting under an issued command.
Figure 11:
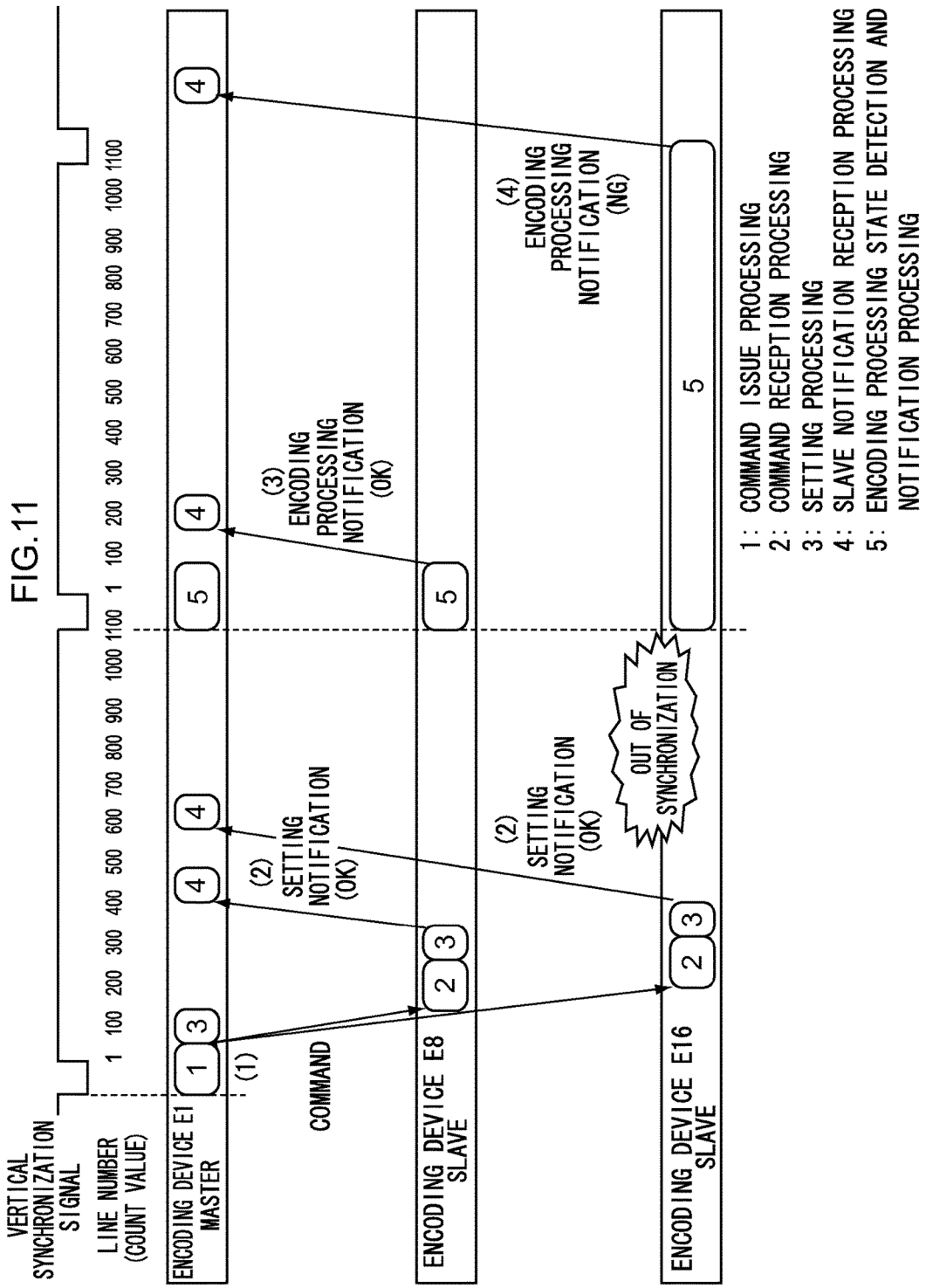
FIG. 11 is a diagram illustrating an example of a timing chart for a case in which an error has occurred at the encoding processing execution stage.

Explanation follows regarding specific examples, using the timing charts of FIG. 9 to FIG. 11. When the processing target is an HD moving picture, the total number of lines of a frame image unit (the total number of horizontal synchronization signals) is 1125, and line numbers are indicated here in 100 line units.

FIG. 9 is an illustration of an example of a timing chart during normal operation.

In FIG. 9, the processing executed by each of the encoding devices E1 to E16 is illustrated by the numbers 1 to 5. "1" indicates command issue processing, "2" illustrates command reception processing, "3" illustrates setting processing on the encoding processing section 34, "4" illustrates reception processing of a setting notification or an encoding processing notification transmitted from a slave, (slave notification reception processing), and "5" illustrates encoding processing state detection/notification processing.

First, in the encoding device E1, as indicated by (1), command issue processing 1 is performed, and a given command is generated and transmitted to the slave-side encoding devices E2 to E16 (see also step 102 in FIG. 5).

In the slave-side encoding devices E2 to E16, when the command is received by command reception processing 2 (see also step 200 in FIG. 7), the setting processing 3 to set the respective encoding processing section 34 is performed according to the received command (see also step 202 in FIG. 7). After the setting processing, a setting notification (status OK) is generated and transmitted to the encoding device E1 (see also step 208 in FIG. 7). The encoding device E1 that issued the command also performs the setting processing 3 on the in-device encoding processing section 34.

The encoding device E1, as illustrated by (2), receives the setting notification transmitted from the encoding devices E2 to E16, by using slave notification reception processing 4 (step 104 of FIG. 5, Y, step 106, OK).

In the frame period one after the frame period in which the command was issued, each of the encoding processing sections 34 of the encoding devices E1 to E16 start encoding processing according to the setting, with the vertical synchronization signal acting as the trigger. The encoding device E1, detects the status of encoding processing of the in-device encoding processing section 34 (OK) using the processing routine of FIG. 6. Each of the encoding devices E2 to E16 detects the state of encoding processing of the in-device encoding processing section 34 using the processing routine illustrated in FIG. 8, and, as illustrated by (3), generates an encoding processing notification and transmits the encoding processing notification to the encoding device E1. In the present example, due to the encoding processing ending normally within the frame period, an encoding processing notification including a status indicating OK is transmitted to the encoding device E1 (see step 252 of FIG. 8).

FIG. 10 is a diagram illustrating an example of a timing chart when an error has occurred at the setting stage occurring due to command issue.

First, in the encoding device E1, the command issue processing 1 illustrated by (1) is performed, and a given command is generated and transmitted to the encoding devices E2 to E16 (see also step 102 in FIG. 5).

In the encoding devices E2 to E15, when the command is received by command reception processing 2, the setting processing 3 to set the encoding processing section 34 is performed according to the received command. After the setting processing, a setting notification (status OK) is generated, and transmitted to the encoding device E1 (see also step 208 in FIG. 7).

However, in the encoding device E16, due to network transmission delays or the like, the setting processing 3 is completed as the frame period in which the command was issued is ending. If the count value input at the point when the setting processing 3 is completed is 1100, and the threshold value for comparison to the count value is 1000, then affirmative determination is made at step 204 of FIG. 7. A setting notification (status NG) is accordingly generated in the encoding device E16, and, as illustrated by (4), the setting notification is transmitted to the encoding device E1 (see also step 206 of FIG. 7). The encoding device E1 that issued the command also performs the setting processing 3 on the in-device encoding processing section 34.

As illustrated by (2), the encoding device E1 receives the setting notifications transmitted from the encoding devices E2 to E15 by the slave notification reception processing 4 (step 104 of FIG. 5, Y, step 106, OK).

In the frame period one after the frame period in which the command was issued, using the vertical synchronization signal as a trigger, each of the encoding processing sections 34 of the encoding devices E1 to E15 starts encoding processing according to the setting. The encoding device E1 detects the state of encoding processing of the in-device encoding processing section 34 using the processing routine illustrated in FIG. 6. As illustrated by (3), the encoding devices E2 to E15 transmit an encoding processing notification containing a status indicating OK to the encoding device E1 (see also step 252 in FIG. 8).

However, in the encoding device E16, due to the delay in completing the setting processing, it is not possible to start the encoding processing using the next input vertical synchronization signal as a trigger. The setting notification sent from the encoding device E16 is received by the encoding device E1 in the frame period one after the frame period in which the command was issued (see also NG of step 106 in FIG. 5). The encoding device E1 accordingly ascertains that synchronization of the encoding device E16 is not being achieved. Therefore, for example, as illustrated by (5), retry processing is performed as the first error processing (see also step 108 in FIG. 5).

FIG. 11 is a diagram illustrating an example of a timing chart for a case in which an error occurs at the encoding processing execution stage.

As illustrated by (1) and (2) of FIG. 11, the processing from command issue to setting processing ends normally, with synchronization achieved. The encoding processing accordingly starts, based on the setting, from the frame period one after the frame period in which the command was issued, and encoding processing ends normally within the frame period for the encoding devices E1 to E15. Using the processing routine illustrated in FIG. 6, the encoding device E1 accordingly detects the state (OK) for the encoding processing of the in-device encoding processing section 34. The encoding devices E2 to E15, each, as illustrated by (3), accordingly transmit an encoding processing notification containing a status indicating OK to the encoding device E1 (see step 252 of FIG. 8).

However, in the present example, in the encoding device E16, one frame's worth of the encoding processing is not completed within the one frame period, and instead processing spans across into the next frame period. This sometimes leads to circumstances in which there is a mismatch in input timing of the divided image signal, or an abnormality occurs in the encoding device E16 itself, or power supply to the encoding device E16 is interrupted during encoding processing.

Thus in the encoding device E16, due to the encoding processing not ending normally within the frame period, as illustrated by (4), an encoding processing notification containing a status indicating NG is transmitted to the encoding device E1 (see also step 254 of FIG. 8).

The encoding processing notification transmitted from the encoding device E16 is received by the encoding device E1 in the next frame period (see also Y at step 110 in FIG. 5). The status of the encoding processing notification indicates NG (see also NG at step 112 in FIG. 5). The encoding device E1 accordingly ascertains that synchronization is not being achieved with the encoding device E16. Therefore, as the second error processing, for example, retry processing is performed, or the system controller is notified that an error has occurred (see step 114 of FIG. 5).

In cases such as slave receiving a command in a frame period after the frame period in which the command was issued, the count value is reset, and sometimes it is not possible to determine the synchronization state at the slave-side from the count value of the horizontal synchronization signal alone. Accordingly, for example, a second counter may be provided in the encoding devices E1 to E16 to also count the vertical synchronization signal. The encoding device E1 then transmits the count value of the vertical synchronization signal included in the command. The encoding devices E2 to E16 then compare the count value of the vertical synchronization signal contained in the command with the count value of the vertical synchronization signal at the point of setting completion, or at the point of encoding processing completion. This thereby enables determination to be made synchronization has been lost if the count values differ from each other, without ascertaining the count value of the horizontal synchronization signal. A setting notification containing a status of NG is generated and transmitted to the encoding device E1 in such cases. When the count value of the vertical synchronization signal contained in the command is the same as the count value of the vertical synchronization signal at the point of setting completion, or at the point of encoding processing completion, the encoding devices E2 to E16 may also make determination by comparing the count value of the horizontal synchronization signal with a threshold value, as explained above.

Although explanation has been given above of an example in which the slave side itself determines OK/NG for setting and encoding processing, and the master side ascertains the synchronization state according to notifications received from the slaves, determination of OK/NG for setting and encoding processing for each of the slaves may be performed on the master side. This is an advantageous method since it thereby enables, for example, the synchronization state to be ascertained early, such as when a command does not arrive at the slave, or arrival of the command is significantly late.

For example, the master encoding device E1 is able to determine that synchronization is not being achieved in cases in which a setting notification is not received from at least one of the slave encoding devices E2 to E16 within the frame period in which the command was transmitted. The encoding device E1 is able to determine that synchronization is being achieved when a setting notification has been received from each of the slave encoding devices E2 to E16 within the frame period in which the command was issued.

The encoding device E1 is also able to determine that synchronization is not being achieved in cases in which an encoding processing notification is not received from at least one of the slave encoding devices E2 to E16 within the frame period for executing the encoding processing. The encoding device E1 is able to determine that synchronization is being achieved in cases in which an encoding processing notification is received from each of the slave encoding devices E2 to E16 within the frame period in which the command was issued.

In such a configuration, the slaves do not need to determine whether or not setting or encoding processing has ended normally, enabling, at the point when the setting processing or the encoding processing has been completed, generation and transmission to the encoding device E1 of setting notifications, or encoding processing notifications, that do not contain a status.

Figure 12:
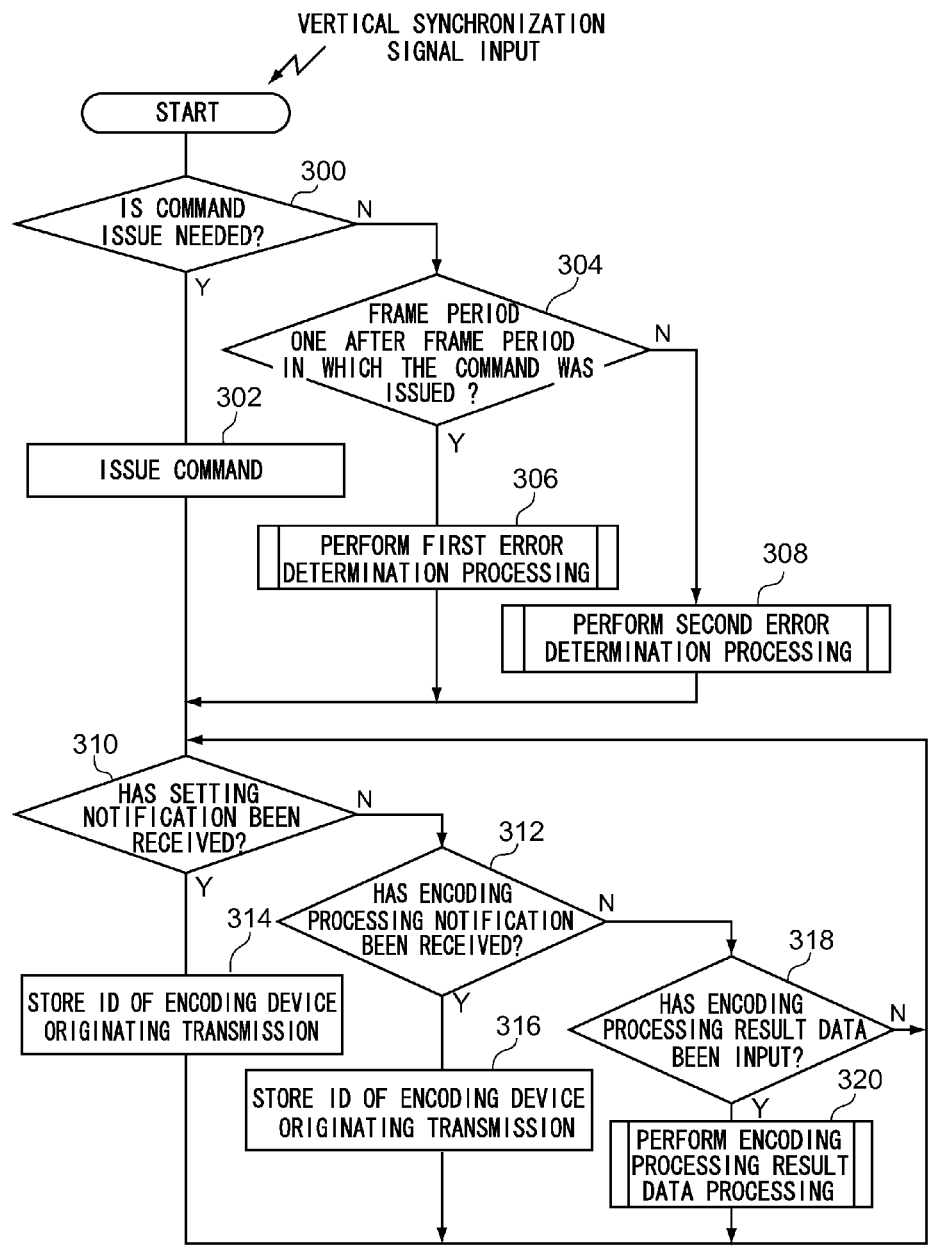
FIG. 12 is a flow chart of a modified example of a synchronization processing routine executed by a synchronization processing section of a master encoding device.
Figure 13:
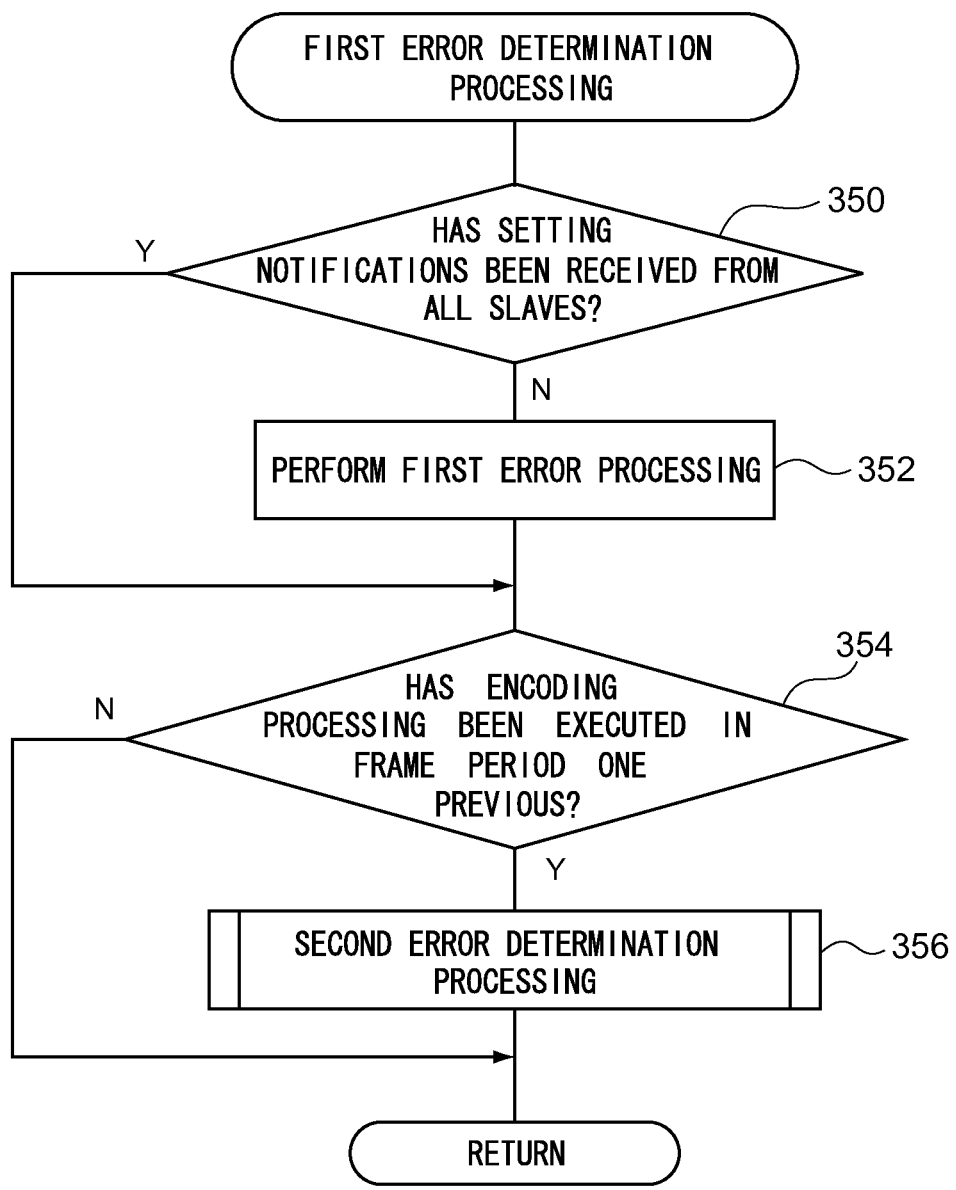
FIG. 13 is a flow chart illustrating first error determination processing.
Figure 14:
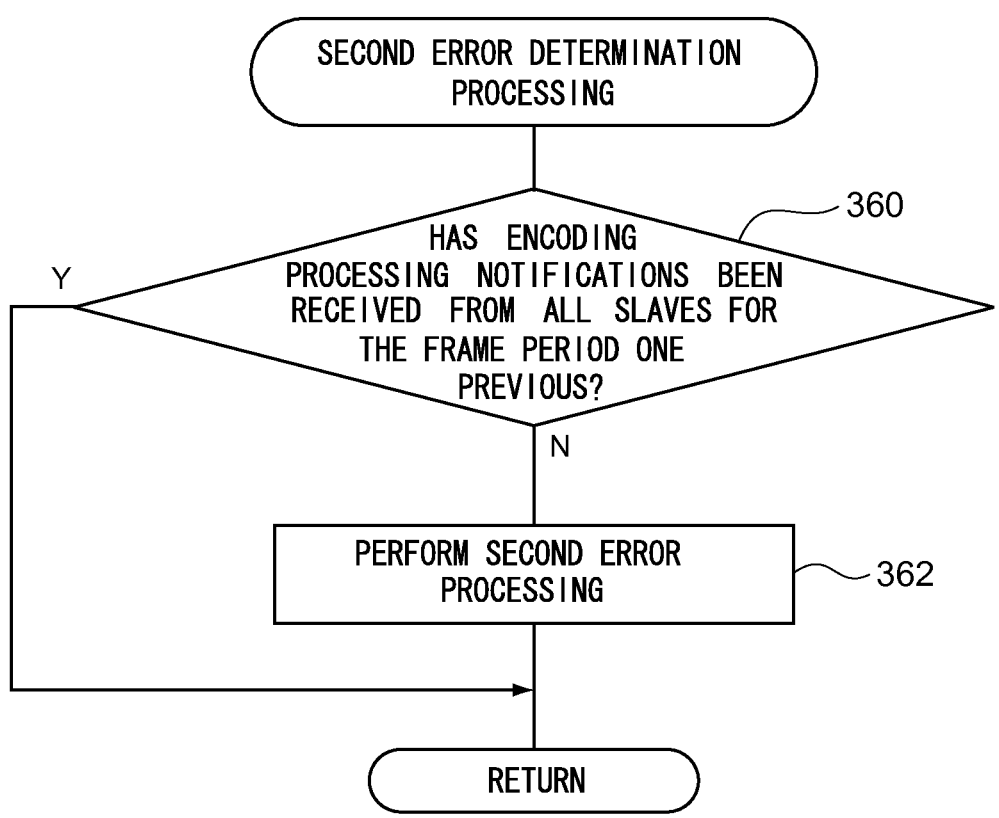
FIG. 14 is a flow chart illustrating second error determination processing.

Explanation next follows regarding an example in which OK/NG determination of setting and encoding processing of the slaves is performed on the master side, with reference to FIG. 12 to FIG. 14.

The synchronization processing routine illustrated in FIG. 12 is a flow chart of a synchronization processing routine executed by the synchronization processing section 32 of the encoding device E1, in place of the synchronization processing routine illustrated in FIG. 5. This synchronization processing routine is started at the timing of input of the vertical synchronization signal.

At step 300, the synchronization processing section 32 determines whether or not a command needs to be issued in the current frame period, similarly to at step 100 in FIG. 5.

If affirmative determination was made at step 300, then at step 302, the synchronization processing section 32 generates and issues the command that needs to be issued (in the present exemplary embodiment, a command to set the encoding start timing, or to set the encoding parameter).

Then at step 310, the synchronization processing section 32 determines whether or not a setting notification has been received from the encoding devices E2 to E16. If affirmative determination is made at step 310, then at step 314, the synchronization processing section 32 stores an identification number (ID) of the encoding device originating transmission of the transmitted setting notification. After step 314, processing then returns to step 310.

If negative determination is made at step 310, then at step 312 the synchronization processing section 32 determines whether or not an encoding processing notification has been received. If affirmative determination is made at step 312, then at step 316 the synchronization processing section 32 stores the identification number (ID) of the encoding device originating the transmitted encoding processing notification. After step 316, processing then returns to step 310.

Configuration may be made such that encoding devices E2 to E16 transmit to the encoding device E1 encoding processing notifications including an identification number, to enable ascertaining of which frame image the frame image belonging to the encoding processed divided image data is. In cases in which, as described above, a counter is provided in each of the encoding devices E1 to E16 to count the vertical synchronization signal, the count value of the vertical synchronization signal when encoding processing started may be included in the encoding processing notification. In such cases, the frame image identification number contained in the encoding processing notification, or the ID of the encoding devices E1 to E16 associated with the count value of the vertical synchronization signal, may be stored at step 316. The encoding device E1 is thereby able to ascertain early on which frame image it is that the encoding processing notification for the divided image data relates to when an encoding processing notification is received, enabling this to be utilized in the determination of step 360 in second error determination processing, described below.

If negative determination is made at step 312, then at step 318 the synchronization processing section 32 determines whether or not encoding processing result data has been input. If affirmative determination is made at step 318, then at step 320 the synchronization processing section 32 executes encoding processing result data processing, as explained with reference to FIG. 6. After step 320, the synchronization processing section 32 returns to step 310. The synchronization processing section 32 also returns to step 310 if negative determination is made at step 318.

If negative determination is made at step 300, at step 304 the synchronization processing section 32 determines whether or not the current frame period is a frame period one after the frame period in which the command was issued (the command issue frame period).

When affirmative determination is made at step 304, then at step 306 first error determination processing is performed. FIG. 13 is a flow chart illustrating first error determination processing.

At step 350, the synchronization processing section 32 determines whether or not setting notifications for the issued command were received in the frame period one previous from all of the slaves (the encoding devices E2 to E16). As described above, the synchronization processing section 32 is configured to store the ID of the slave that transmitted the setting notification at step 314. The synchronization processing section 32 performs determination of step 350 by confirming the IDs stored.

If affirmative determination is made at step 350, the synchronization processing section 32 does not perform error processing or the like, since this is an indication that the setting processing on the encoding processing sections 34 of the encoding devices E1 to E16 has ended normally within the frame period in which the command was issued, and so proceeds to step 354.

However, if negative determination is made at step 350, since this is an indication that the setting processing on the encoding processing sections 34 of one or other of the encoding devices E2 to E16 has not ended normally, at step 352 the synchronization processing section 32 executes the first error processing, described above.

Explanation has been given here of a case in which the encoding device E1 ends setting of the in-device encoding processing section 34 normally.

Then, at step 354, the synchronization processing section 32 determines whether or not the encoding processing has been executed in the frame period one previous. If affirmative determination is made at step 354, then at step 356 the synchronization processing section 32 performs the second error determination processing. Details regarding the second error determination processing are given below. The synchronization processing section 32 ends the current processing routine if negative determination is made at step 354.

After performing the first error determination processing of step 306, the synchronization processing section 32 proceeds to step 310, and performs the processing that has been explained above.

If negative determination is made at step 304 of FIG. 12, then at step 308 the synchronization processing section 32 performs the second error determination processing. The second error determination processing is still performed even when affirmative determination was made at step 354. FIG. 14 is a flow chart illustrating the second error determination processing.

At step 360, the synchronization processing section 32 determines whether or not the encoding processing notifications that should have been received in the frame period one previous were received from all the slaves (the encoding devices E2 to E16) in the frame period one previous.

As described above, at step 316, the synchronization processing section 32 stores the ID of slaves that have transmitted encoding processing notifications. The synchronization processing section 32 performs determination of step 360 by confirming the stored IDs.

In cases in which the encoding devices E2 to E16 include identification numbers of frame images, or count value of the vertical synchronization signal, in the generated encoding processing notifications, the encoding device E1 confirms the encoding device ID stored for each of the identification numbers or count values. Namely, at step 360, the encoding device E1 may confirm the stored encoding device IDs associated with the identification number of the frame image that should have been processed in the frame period one previous, or associated with count value of the vertical synchronization signal.

If affirmative determination is made at step 360, the synchronization processing section 32 ends the current processing routine since this indicates that the encoding processing was synchronized and ended normally within the frame period in the encoding processing sections 34 of the encoding devices E1 to E16.

However, if negative determination is made at step 360, since this indicates that the encoding processing was not synchronized and did not end normally in one or other of the encoding devices E2 to E16, then at step 362 the synchronization processing section 32 executes the above second error processing.

Explanation has been given of a case in which the encoding device E1 ends the in-device encoding processing normally, however second error processing may also be executed in cases in which the in-device encoding processing has not ended normally.

After the second error determination processing of step 308, the synchronization processing section 32 proceeds to step 310, and performs the processing explained above.

The method for the encoding device E1 to independently determine the state of the encoding processing sections 34 of the encoding devices E2 to E16 and monitor the synchronization state is not limited to the above example.

For example, configuration may be made such that the encoding devices E2 to E16 include the count value output from the B terminal of the signal input section 30 in the setting notifications and the encoding processing notifications transmitted to the encoding device E1, and the encoding device E1 then monitors the synchronization state with reference to the count values.

Specifically, for example, in relation to setting processing on the encoding processing section 34, the encoding devices E2 to E16 generate setting notifications including the count value of the horizontal synchronization signal that was input when setting on the in-device encoding processing section 34 was completed. The encoding device E1 is thereby able to determine that the setting processing ended normally within the frame period in which the command was issued if the count value contained in the setting notification is a predetermined threshold value or lower. The encoding device E1 is also able to determine that the setting processing did not end normally within the frame period in which the command was issued if the count value contained in the setting notification exceeds the threshold value.

The count value of the horizontal synchronization signal input when the command was received by the encoding devices E2 to E16 may also be included in the setting notifications. The encoding device E1 is then able to determine whether or not the setting processing ended normally by comparing this count value to a predetermined threshold value. This is because if the count value is greater than the threshold value, then there is only a short period of time from when the command was received to input of the next vertical synchronization signal, and so it is suspected that the setting processing could not be completed before input of the next vertical synchronization signal.

The setting notifications may include both the count value that was input when the command was received by each of the encoding devices E2 to E16, and the count value that was input when setting on the encoding processing section 34 was completed. The encoding device E1 is thereby able to monitor the synchronization state by performing processing to compare each of the two count values with two different threshold values.

In cases in which a slave received a command in the frame period after the frame period in which the command was issued, the count value contained in the setting notification transmitted from the slave is the count value of the following frame. In such cases, since the setting notification is received in the frame period after the frame period in which the command was issued, the master is able to ascertain that synchronization has been lost without needing to perform determination by the count value.

Similarly, configuration may be made such that the encoding devices E2 to E16 also generate encoding processing notifications containing the count value of the horizontal synchronization signal input when the setting processing was completed, for transmission to the encoding device E1. The encoding device E1 is thereby able, by comparing the count value against a predetermined threshold value, to ascertain whether or not the encoding processing has been performed in each of the encoding devices E2 to E16 within the same frame period for the divided image data of the same frame image.

As described above, identification numbers may be included in the generated encoding processing notifications to enable ascertainment of which frame image the frame image belonging to the encoding processed divided image data is. For encoding processing notifications transmitted in cases in which encoding processing has not been completed within one frame period (see also FIG. 11), the encoding device E1 is capable of ascertaining that synchronization has been lost without needing to reference the count value of the horizontal synchronization signal. As described above, in cases in which a counter is provided to the encoding devices E1 to E16 to count the vertical synchronization signal, the count value may be included in the encoding processing notifications of the vertical synchronization signal when encoding processing started. Such cases enable the encoding device E1 to ascertain whether or not synchronization of encoding processing has been lost with the encoding device that transmitted the encoding processing notification by referencing the count value of the vertical synchronization signal contained in the encoding processing notification.

Moreover, the encoding device E1 may also be configured to issue a command containing the count value of the horizontal synchronization signal when the command was generated, or immediately before issuing the command. Each of the encoding devices E2 to E16 may be configured so as to generate and transmit to the encoding device E1 a setting notification containing the count value when a command was received, the count value when the setting processing was completed, and the count value contained in the command received from the encoding device E1. This thereby enables the count values to be utilized in abnormality analysis in cases in which an abnormality has occurred, such as synchronization being lost for one or other of the encoding devices E1 to En.

Configuration may be made to perform monitoring of the synchronization state by a combination of both a method in which the encoding device E1 performs OK/NG determination of setting and encoding processing of each of the encoding devices E2 to E16, and a method in which OK/NG determination of setting and encoding processing of each of the encoding devices E2 to E16 is performed by themselves.

Although explanation has been given above of a mode in which a program for synchronization processing of a master and slave is stored on a ROM 60, the synchronization processing program may be provided in a recorded format on a portable recording medium, such as a CD-ROM, DVD-ROM, or USB memory.

Note that it is possible to implement the synchronization processing section 32 and the synchronization processing section 42 with, for example, a semiconductor integrated circuit, and more specifically with an application specific integrated circuit (ASIC) or the like, and it is possible to implement the synchronization processing section 32 and the synchronization processing section 42 with, for example, an electrical circuit or the like.

Technology disclosed herein enables, without increasing cost, encoding parameters to be synchronized by frame unit in plural encoding devices, and to be dynamically switched, while monitoring the synchronization state.

All publication, patent applications and technical standards mentioned in the present specification are incorporated by reference in the present specification to the same extent as if the individual publication, patent application, or technical standard was specifically and individually indicated to be incorporated by reference.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An encoding system comprising:
    a plurality of encoding devices that each include an encoding processing unit configured to, at a timing in accordance with a vertical synchronization signal included in a moving picture signal, encode divided image data arising when a frame image unit of image data included in the moving picture signal is divided into a plurality of divided image data, wherein one of the encoding devices acts as a single main encoding device and the remaining one or more encoding devices act as one or more ancillary encoding devices;
    a main synchronization processing unit configured to be provided in the main encoding device, in accordance with the vertical synchronization signal, to transmit a setting signal to the ancillary encoding device to perform setting on the encoding processing unit, so that a start timing of encoding processing by each of the plurality of encoding processing units and a switching timing of an encoding parameter are synchronized in frame image units, and to monitor a synchronization state of the plurality of encoding devices based on a state signal representing a state of the encoding processing unit of the ancillary encoding device received from the ancillary encoding device; and
    an ancillary synchronization processing unit configured to be provided at the ancillary encoding device, to perform setting of the in-device encoding processing unit according to the setting signal received from the main encoding device, and to transmit a state signal representing a state of the in-device encoding processing unit to the main encoding device.

2. The encoding system of claim 1, wherein the main synchronization processing unit determines the synchronization state of the plurality of encoding devices, based on whether or not a state signal representing a setting state of the encoding processing unit has been received from the ancillary encoding device, from when the setting signal was transmitted to the ancillary encoding device until the input of the next vertical synchronization signal.

3. The encoding system of claim 1, wherein the main synchronization processing unit determines the synchronization state of the plurality of encoding devices, based on whether or not a state signal, representing an encoding processing state of the encoding processing unit for the frame image that should be encoding processed in a time period from input of the vertical synchronization signal to input of the next vertical synchronization signal, has been received from the ancillary encoding device.

4. The encoding system of claim 1, wherein:
    a counter unit is further provided at each of the plurality of encoding devices to count a horizontal synchronization signal included in the moving picture signal;
    the ancillary synchronization processing unit includes a count value by the counter unit in the state signal for transmission; and
    the main synchronization processing unit determines the synchronization state of the plurality of encoding devices based on the count value included in the state signal received from the ancillary encoding device.

5. The encoding system of claim 1, wherein:
    a counter unit is further provided at each of the plurality of encoding devices to count a horizontal synchronization signal included in the moving picture signal;
    the ancillary synchronization processing unit determines the in-device synchronization state in the plurality of encoding devices based on the count values, and transmits a determination result included in the state signal; and
    the main synchronization processing unit determines the synchronization state of the plurality of encoding devices from the determination result included in the state signal.

6. An encoding device that functions as a main encoding device of a plurality of encoding devices, each including an encoding processing unit configured to, at a timing in accordance with a vertical synchronization signal included in a moving picture signal, encodes divided image data arising when a frame image unit of image data included in the moving picture signal is divided into a plurality of divided image data, wherein each of the remaining one or more encoding devices other than the single main encoding device is provided with an ancillary synchronization processing unit that performs setting on the in-device encoding processing unit according to a setting signal received from the main encoding device, and transmit a state signal representing the state of the in-device encoding processing unit to the main encoding device,
    the encoding device functioning as the main encoding device comprising a main synchronization processing unit configured to, in accordance with the vertical synchronization signal, transmits a setting signal to the ancillary encoding device to perform setting on the encoding processing unit, so that a start timing of encoding processing by each of the plurality of encoding processing units and a switching timing of encoding parameters are synchronized in frame image units, and to monitor a synchronization state of the plurality of encoding devices based on the state signal representing the state of the encoding processing unit of the ancillary encoding device received from the ancillary encoding device.

7. The encoding device of claim 6, wherein the main synchronization processing unit determines the synchronization state of the plurality of encoding devices, based on whether or not a state signal representing a setting state of the encoding processing unit has been received from the ancillary encoding device, from when the setting signal was transmitted to the ancillary encoding device until the input of the next vertical synchronization signal.

8. The encoding device of claim 6, wherein the main synchronization processing unit determines the synchronization state of the plurality of encoding devices, based on whether or not, in a time period from input of the vertical synchronization signal to input of the next vertical synchronization signal, a state signal representing an encoding processing state of the encoding processing unit for the frame image that should be encoding processed has been received from the ancillary encoding device.

9. The encoding device of claim 6, wherein:
a counter unit is further provided at each of the plurality of encoding devices to count a horizontal synchronization signal included in the moving picture signal;
the ancillary synchronization processing unit includes a count value by the counter unit in the state signal for transmission; and
the main synchronization processing unit determines the synchronization state of the plurality of encoding devices based on the count value included in the state signal received from the ancillary encoding device.

10. The encoding device of claim 6, wherein:
a counter unit is further provided at each of the plurality of encoding devices to count a horizontal synchronization signal included in the moving picture signal;
the ancillary synchronization processing unit determines the in-device synchronization state in the plurality of encoding devices based on the count values, and transmits a determination result included in the state signal; and
the main synchronization processing unit determines the synchronization state of the plurality of encoding devices from the determination result included in the state signal.

11. An encoding method comprising:
in cases in which, among a plurality of encoding devices that each include an encoding processing unit that, in accordance with a vertical synchronization signal included in a moving picture signal, encodes divided image data arising when a frame image unit of image data included in the moving picture signal is divided into a plurality of divided image data, one of the encoding devices out of the plural encoding devices acts as a main encoding device and the remaining one or more encoding devices other than the main encoding device act as one or more ancillary encoding devices,
via the main encoding device, in accordance with the vertical synchronization signal, transmitting a setting signal to the ancillary encoding device to perform setting on the encoding processing unit, so that a start timing of encoding processing by each of the plurality of encoding processing units and a switching timing of encoding parameters are synchronized in frame image units, and monitoring a synchronization state of the plurality of encoding devices based on a state signal representing a state of the encoding processing unit of the ancillary encoding device received from the ancillary encoding device; and
via the ancillary encoding device, performing setting of the in-device encoding processing unit according to the setting signal received from the main encoding device, and transmitting a state signal representing a state of the in-device encoding processing unit to the main encoding device.

12. The encoding method of claim 11, wherein the main synchronization processing unit determines the synchronization state of the plurality of encoding devices, based on whether or not a state signal representing a setting state of the encoding processing unit has been received from the ancillary encoding device, from when the setting signal was transmitted to the ancillary encoding device until the input of the next vertical synchronization signal.

13. The encoding method of claim 11, wherein the main synchronization processing unit determines the synchronization state of the plurality of encoding devices, based on whether or not, in a time period from input of the vertical synchronization signal to input of the next vertical synchronization signal, a state signal representing an encoding processing state of the encoding processing unit for the frame image that should be encoding processed has been received from the ancillary encoding device.

14. The encoding method of claim 11, wherein:
a counter unit is further provided at each of the plurality of encoding devices to count a horizontal synchronization signal included in the moving picture signal;
the ancillary encoding devices include a count value by the counter unit in the state signal for transmission; and
the main encoding device determines the synchronization state of the plurality of encoding devices based on the count value included in the state signal received from the ancillary encoding device.

15. The encoding method of claim 11, wherein:
a counter unit is further provided at each of the plurality of encoding devices to count a horizontal synchronization signal included in the moving picture signal;
the ancillary synchronization processing unit determines the in-device synchronization state in the plurality of encoding devices based on the count values, and transmits a determination result included in the state signal; and
the main synchronization processing unit determines the synchronization state of the plurality of encoding devices from the determination result included in the state signal.

* * * * *